(12) United States Patent
Zhu et al.

(10) Patent No.: US 11,743,793 B2
(45) Date of Patent: *Aug. 29, 2023

(54) INTER-SYSTEM HANDOVER BETWEEN STANDALONE MODE AND NON-STANDALONE MODE

(71) Applicant: QUALCOMM Incorporated, San Diego, CA (US)

(72) Inventors: Xipeng Zhu, San Diego, CA (US); Tom Chin, San Diego, CA (US); Kuo-Chun Lee, San Diego, CA (US); Ajith Tom Payyappilly, San Diego, CA (US); Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/531,262

(22) Filed: Nov. 19, 2021

(65) Prior Publication Data

US 2022/0078687 A1 Mar. 10, 2022

Related U.S. Application Data

(63) Continuation of application No. 16/534,404, filed on Aug. 7, 2019, now Pat. No. 11,184,821.
(Continued)

(51) Int. Cl.
*H04W 36/00* (2009.01)
*H04W 36/14* (2009.01)
(Continued)

(52) U.S. Cl.
CPC ............ *H04W 36/14* (2013.01); *H04W 8/22* (2013.01); *H04W 36/0058* (2018.08); *H04W 36/0079* (2018.08); *H04W 36/32* (2013.01)

(58) Field of Classification Search
CPC ............ H04W 36/14; H04W 36/0079; H04W 36/0058; H04W 36/32; H04W 8/22
See application file for complete search history.

(56) References Cited

U.S. PATENT DOCUMENTS 8,359,373 B2  1/2013  Rofougaran
11,184,821 B2  11/2021  Zhu et al.
(Continued)

FOREIGN PATENT DOCUMENTS

CN  107950056 A  4/2018
EP  2770777 A1 *  8/2014  ........ H04W 36/0055
(Continued)

OTHER PUBLICATIONS

3GPP TR 38.804: "3rd Generation Partnership Project; Technical Specification Group Radio Access Network; Study on New Radio Access Network; Study on New Radio Access Technology; Radio Interface Protocol Aspects (Release 14)", 3GPP Standard; Technical Report; 3GPP TR 38.804, 3rd Generation Partnership Project (3GPP), Mobile Competence Centre; 650, Route Des Lucioles; F-06921 Sophia-Antipolis Cedex; France, vol. RAN WG2, No. V14.0.0, Mar. 24, 2017, pp. 1-57, XP051297619, [retrieved on Mar. 24, 2017] para.4,5 and para.10.2., Abstract.
(Continued)

*Primary Examiner* — Khai M Nguyen
(74) *Attorney, Agent, or Firm* — Qualcomm Incorporated

(57) ABSTRACT

Various aspects of the disclosure relate to handover of a user equipment (UE) between a standalone mode of operation and a non-standalone mode of operation. For example, a UE may be handed-over from standalone to non-standalone, or vice versa. Moreover, this handover may be an inter-system handover (e.g., between an LTE core network and an NR core network).

30 Claims, 15 Drawing Sheets

Related U.S. Application Data

(60) Provisional application No. 62/716,960, filed on Aug. 9, 2018.

(51) Int. Cl.
  *H04W 36/32* (2009.01)
  *H04W 8/22* (2009.01)

(56) References Cited

U.S. PATENT DOCUMENTS

| | | | |
|---|---|---|---|
| 11,553,379 B2* | 1/2023 | Park | H04W 36/0005 |
| 2005/0060089 A1 | 3/2005 | Garin et al. | |
| 2012/0177003 A1 | 7/2012 | Chan et al. | |
| 2016/0095034 A1* | 3/2016 | Hampel | H04W 36/14 370/331 |
| 2019/0053111 A1* | 2/2019 | Wu | H04W 88/06 |
| 2019/0053115 A1* | 2/2019 | Ngai | H04W 88/10 |
| 2019/0281011 A1* | 9/2019 | Pang | H04L 61/5061 |
| 2019/0297538 A1 | 9/2019 | Keller et al. | |
| 2019/0342824 A1 | 11/2019 | Futaki et al. | |
| 2020/0053616 A1* | 2/2020 | Zhu | H04W 36/0027 |
| 2020/0260364 A1* | 8/2020 | Vandervelde | H04W 36/0077 |
| 2020/0396656 A1 | 12/2020 | Yang et al. | |

FOREIGN PATENT DOCUMENTS

| | | | |
|---|---|---|---|
| EP | 3267555 A1 * | 1/2018 | H02J 50/80 |
| EP | 3764693 B1 * | 2/2022 | H04W 36/0033 |
| WO | WO-2007144028 A1 | 12/2007 | |
| WO | WO-2018028957 A1 | 2/2018 | |

OTHER PUBLICATIONS

"3rd Generation Partnership Project; Technical Specification Group Radio Access Network; Study on New Radio Access Technology; Radio Access Architecture and Interfaces (Release 14)", 3GPP Draft; R3-170744_TR 38 801 V120 (With Revision Marks), 3rd Generation Partnership Project (3GPP), Mobile Competence Centre; 650, Route Des Lucioles; F-06921 Sophia-Antipolis Cedex; France, Feb. 26, 2017 (Feb. 26, 2017), pp. 1-89, XP051237647, Retrieved from the Internet: URL: http://www.3gpp.org/ftp/tsg_ran/WG3_lu/TSGR3_95/Docs/[retrieved on Feb. 26, 2017] para.10.2.
International Search Report and Written Opinion—PCT/US2019/045714—ISA/EPO—dated Sep. 26, 2019.
Qualcomm Incorporated: "(TP for NR BL CR for TS 37.340): Inter-System Handover Between SA and NSA", 3GPP TSG-RAN3 #101, 3GPP Draft, R3-184683 Inter-System Handover Between SA and NSA, 3rd Generation Partnership Project (3GPP), Mobile Competence Centre, 650, Route Des Lucioles, F-06921 Sophia-Antipolis Cedex, France, vol. RAN WG3, No. Gothenburg, Sweden, Aug. 20, 2018-Aug. 24, 2018, Aug. 11, 2018 (Aug. 11, 2018), 4 Pages, XP051528030, Retrieved from the Internet: URL: http://www.3gpp.org/ftp/tsg%5Fran/WG3%5Flu/TSGR3%5F101/Docs/R3%2D184683%2Ezip [retrieved on Aug. 11, 2018] the whole document.
Taiwan Search Report—TW108128237—TIPO—dated Dec. 9, 2022.

* cited by examiner

INTER-SYSTEM HANDOVER BETWEEN STANDALONE MODE AND NON-STANDALONE MODE

CROSS-REFERENCE TO RELATED APPLICATION(S)

This application is a continuation of patent application Ser. No. 16/534,404 filed in the U.S. Patent and Trademark Office on Aug. 7, 2019. Patent application Ser. No. 16/534,404 claims priority to and the benefit of provisional patent application No. 62/716,960 filed in the U.S. Patent and Trademark Office on Aug. 9, 2018, the entire content of which is incorporated herein by reference.

INTRODUCTION

Various aspects described herein relate to wireless communication and, more particularly but not exclusively, to handing-over a user equipment between a standalone mode and a non-standalone mode.

A wireless communication network may be deployed over a defined geographical area to provide various types of services (e.g., voice, data, multimedia services, etc.) to users within that geographical area. In a typical implementation, base stations (e.g., corresponding to different cells) are distributed throughout a network to provide wireless connectivity for user equipment (e.g., cell phones) operating within the geographical area served by the network.

At a given point in time, a user equipment (UE) may be served by a given one of these base stations. As the UE roams throughout the geographical area, the UE may move away from its serving base station and move closer to another base station. In addition, signal conditions within a given cell may change, whereby a UE terminal may be better served by another base station. In these cases, to maintain mobility for the UE, the UE may be handed-over from its serving base station to another base station.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a processing circuit and an interface coupled to the processing circuit. The processing circuit is configured to: operate in a standalone mode of operation with a first type of core network associated with a first type of protocol stack; determine that the apparatus is to be handed-over from the standalone mode of operation to a non-standalone mode of operation; and operate in a non-standalone mode of operation with a second type of core network associated with a second type of protocol stack as a result of the determination.

In one aspect, the disclosure provides a method of communication for an apparatus. The method includes: operating in a standalone mode of operation with a first type of core network associated with a first type of protocol stack; determining that the apparatus is to be handed-over from the standalone mode of operation to a non-standalone mode of operation; and operating in a non-standalone mode of operation with a second type of core network associated with a second type of protocol stack as a result of the determination.

In one aspect, the disclosure provides an apparatus configured for communication. The apparatus includes: means for operating in a standalone mode of operation with a first type of core network associated with a first type of protocol stack; means for determining that the apparatus is to be handed-over from the standalone mode of operation to a non-standalone mode of operation; and means for operating in a non-standalone mode of operation with a second type of core network associated with a second type of protocol stack as a result of the determination.

In one aspect, the disclosure provides a non-transitory computer-readable medium storing computer-executable code, including code to: operate in a standalone mode of operation with a first type of core network associated with a first type of protocol stack; determine that the apparatus is to be handed-over from the standalone mode of operation to a non-standalone mode of operation; and operate in a non-standalone mode of operation with a second type of core network associated with a second type of protocol stack as a result of the determination.

In one aspect, the disclosure provides an apparatus configured for communication that includes a processing circuit and an interface coupled to the processing circuit. The processing circuit is configured to: determine that a user equipment is to be handed-over from a standalone mode of operation to a non-standalone mode of operation; and send a message for handover of the user equipment from a first type of core network associated with a first type of protocol stack to a second type of core network associated with a second type of protocol stack as a result of the determination that the user equipment is to be handed-over.

In one aspect, the disclosure provides a method of communication for an apparatus. The method includes: determining that a user equipment is to be handed-over from a standalone mode of operation to a non-standalone mode of operation; and sending a message for handover of the user equipment from a first type of core network associated with a first type of protocol stack to a second type of core network associated with a second type of protocol stack as a result of the determination that the user equipment is to be handed-over.

In one aspect, the disclosure provides an apparatus configured for communication. The apparatus includes: means for determining that a user equipment is to be handed-over from a standalone mode of operation to a non-standalone mode of operation; and means for sending a message for handover of the user equipment from a first type of core network associated with a first type of protocol stack to a second type of core network associated with a second type of protocol stack as a result of the determination that the user equipment is to be handed-over.

In one aspect, the disclosure provides a non-transitory computer-readable medium storing computer-executable code, including code to: determine that a user equipment is to be handed-over from a standalone mode of operation to a non-standalone mode of operation; and send a message for handover of the user equipment from a first type of core network associated with a first type of protocol stack to a second type of core network associated with a second type of protocol stack as a result of the determination that the user equipment is to be handed-over.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
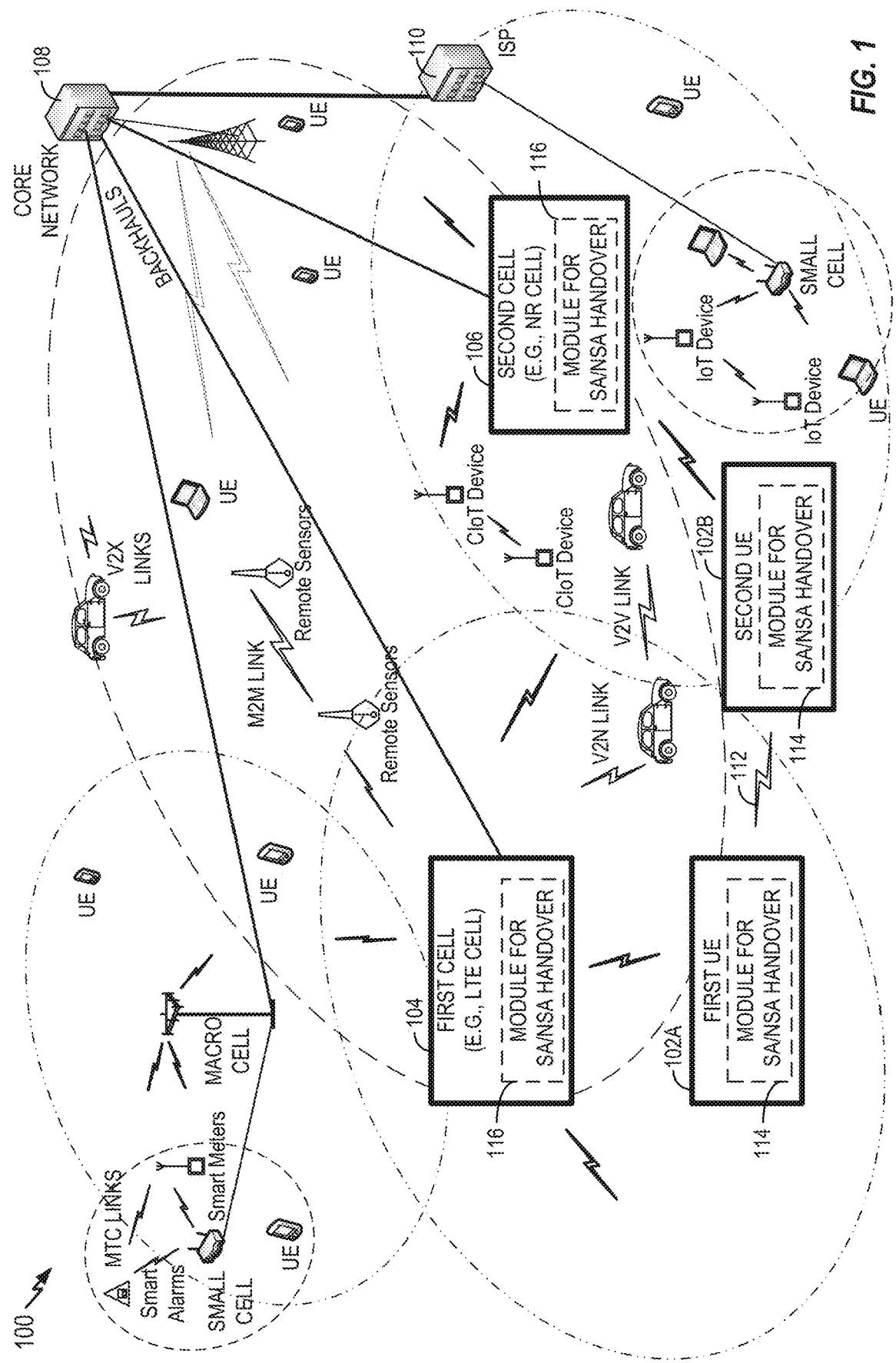
FIG. 1 is a diagram illustrating an example communication system within which aspects of the disclosure may be implemented.

Various aspects of the disclosure relate to handover of a UE between a standalone mode of operation and a non-standalone mode of operation. For example, the disclosure relates in some aspects to defining a UE capability for inter-system handover from a 5G new radio (NR) standalone mode of operation to an E-UTRAN NR—dual connectivity (EN-DC) mode of operation.

In a standalone mode of operation, a device (e.g., a UE) uses a single radio access technology (RAT). Three standalone options are defined by the 3rd Generation Partnership Project (3GPP). Option 1 involves 4G evolved packet core (EPC) and 3GPP Long-Term Evolution (LTE) eNB access (e.g., as in a 4G LTE network). Option 2 involves 5G core network (5GC) and New Radio (NR) gNB access. Option 5 involves 5GC and LTE Next Generation-eNB (ng-eNB) access.

In a non-standalone mode of operation, a device (e.g., a UE) uses multiple radio access technologies (RATs). Three non-standalone options are defined by 3GPP. Option 3 involves using EPC and an LTE eNB acting as a master base station and an NR en-gNB acting as a secondary base station. Option 4 involves 5GC and NR gNB access. Option 5 involves 5GC and ng-eNB access.

Intra-system handover from a standalone (SA) mode of operation to a non-standalone (NSA) mode of operation is a known concept. For example, section 10.9 of the 3GPP specification TS 37.340 defines intra-system SA to NSA handover for a 5G scenario.

However, an inter-system SA to NSA handover (or vice versa) may also be useful in some scenarios. In some aspects, inter-system (e.g., inter-RAT) handover refers to handover between different types of core networks (e.g., between a 4G evolved packet core (EPC) core network and a 5G core network, 5GC). For example, SA to NSA handover may be used in Evolved Packet System (EPS) fallback scenarios, such as Option 2 (NR connected to 5G core network, 5GC) to Option 3 (E-UTRAN NR—dual connectivity. EN-DC) handover. As a specific example, when a UE with an ongoing high-performance demand data service needs to perform a mobile oriented (MO) or mobile terminated (MT) voice call but Voice over NR (VoNR) is not supported, falling-back to EPS and keeping NR as the secondary node (SN) may help to preserve a good user experience (e.g., by maintaining ongoing data service).

The following issues may arise from the UE point of view in supporting inter-system (e.g., inter-RAT) handover from a NR standalone mode of operation to an EN-DC mode of operation. The NR protocol stack may change the role from "master with 5GC connection" to "secondary with EPC connection." The NR protocol stack may sustain the aforementioned "master" role and "secondary" role during inter-system handover so it can roll back to the source configuration in case of handover failure. The disclosure relates in some aspects to handling these and/or other issues that may be associated with inter-system SA to NSA handover, as well as inter-system NSA to SA handover.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. Moreover, alternate configurations may be devised without departing from the scope of the disclosure. Additionally, well-known elements will not be described in detail or will be omitted so as not to obscure the relevant details of the disclosure.

The various concepts presented throughout this disclosure may be implemented across a broad variety of telecommunication systems, network architectures, and communication standards. For example, the 3rd Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Thus, the teachings herein can be implemented according to various network technologies including, without limitation, 5G technology, fourth generation (4G) technology, third generation (3G) technology, and other network architectures. Thus, various aspects of the disclosure may be extended to networks based on 3rd Generation Partnership Project (3GPP) Long Term Evolution (LTE). LTE-Advanced (LTE-A) (in FDD, TDD, or both modes), Universal Mobile Telecommunications System (UMTS), Global System for Mobile Communications (GSM), Code Division Multiple Access (CDMA), Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. Also, the techniques described herein may be used for a downlink, an uplink, a peer-to-peer link, or some other type of link.

The actual telecommunication standard, network architecture, and/or communication standard used will depend on the specific application and the overall design constraints imposed on the system. For purposes of illustration, the following may describe various aspects in the context of a 5G system and/or an LTE system. It should be appreciated, however, that the teachings herein may be used in other systems as well. Thus, references to functionality in the context of 5G and/or LTE terminology should be understood to be equally applicable to other types of technology, networks, components, signaling, and so on.

Example Communication System

FIG. 1 illustrates an example of a wireless communication system 100 where a user equipment (UE) can communicate with other devices via wireless communication signaling. For example, a first UE 102A and a second UE 102B may communicate with a first cell 104 (e.g., an LTE base station), a second cell 106 (e.g., an NR base station), some other cell, or a combination thereof, using wireless communication resources managed by the first cell 104, the second cell 106, other network components (e.g., a core network 108, an internet service provider (ISP) 110, peer devices, and so on), or a combination thereof. In some implementations, one or more of the components of the system 100 may communicate with each other directedly via a device-to-device (D2D) link 112 or some other similar type of direct link.

Communication of information between two or more of the components of the system 100 may result in a handover from one cell to another. For example, the second UE 102B may be handed-over from the second cell 106 to the first cell 104, or vice versa. In accordance with the teachings herein, one or more of the first UE 102A, the second UE 102B, or some other component of the system 100 may include a module for SA/NSA handover 114. In accordance with the teachings herein, one or more of the first cell 104, the second cell 106, or some other component of the system 100 may include a module for SA/NSA handover 116.

The components and links of the wireless communication system 100 may take different forms in different implementations. For example, and without limitation, UEs may be cellular devices, Internet of Things (I) devices, cellular IoT (CIoT) devices, LTE wireless cellular devices, machine-type communication (MTC) cellular devices, smart alarms, remote sensors, smart phones, mobile phones, smart meters, personal digital assistants (PDAs), personal computers, mesh nodes, and tablet computers.

In some aspects, a TRP may refer to a physical entity that incorporates radio head functionality for a particular physical cell. In some aspects, the TRP may include 5G new radio (NR) functionality with an air interface based on orthogonal frequency division multiplexing (OFDM). NR may support, for example and without limitation, enhanced mobile broadband (eMBB), mission-critical services, and wide-scale deployment of IoT devices. The functionality of a TRP may be similar in one or more aspects to (or incorporated into) the functionality of a CIoT base station (C-BS), a NodeB, an evolved NodeB (eNodeB), radio access network (RAN) access node, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other suitable entity. In different scenarios (e.g., NR, LTE, etc.), a TRP may be referred to as a gNodeB (gNB), an eNB, a base station, or referenced using other terminology.

Various types of network-to-device links and D2D links may be supported in the wireless communication system 100. For example, D2D links may include, without limitation, machine-to-machine (M2M) links, MTC links, vehicle-to-vehicle (V2V) links, vehicle-to-anything (V2X) links, and cellular V2X (CV2X) links. Network-to-device links may include, without limitation, uplinks (or reverse links), downlinks (or forward links), and vehicle-to-network (V2N) links.

Example SA/NSA Handover

Figure 2:
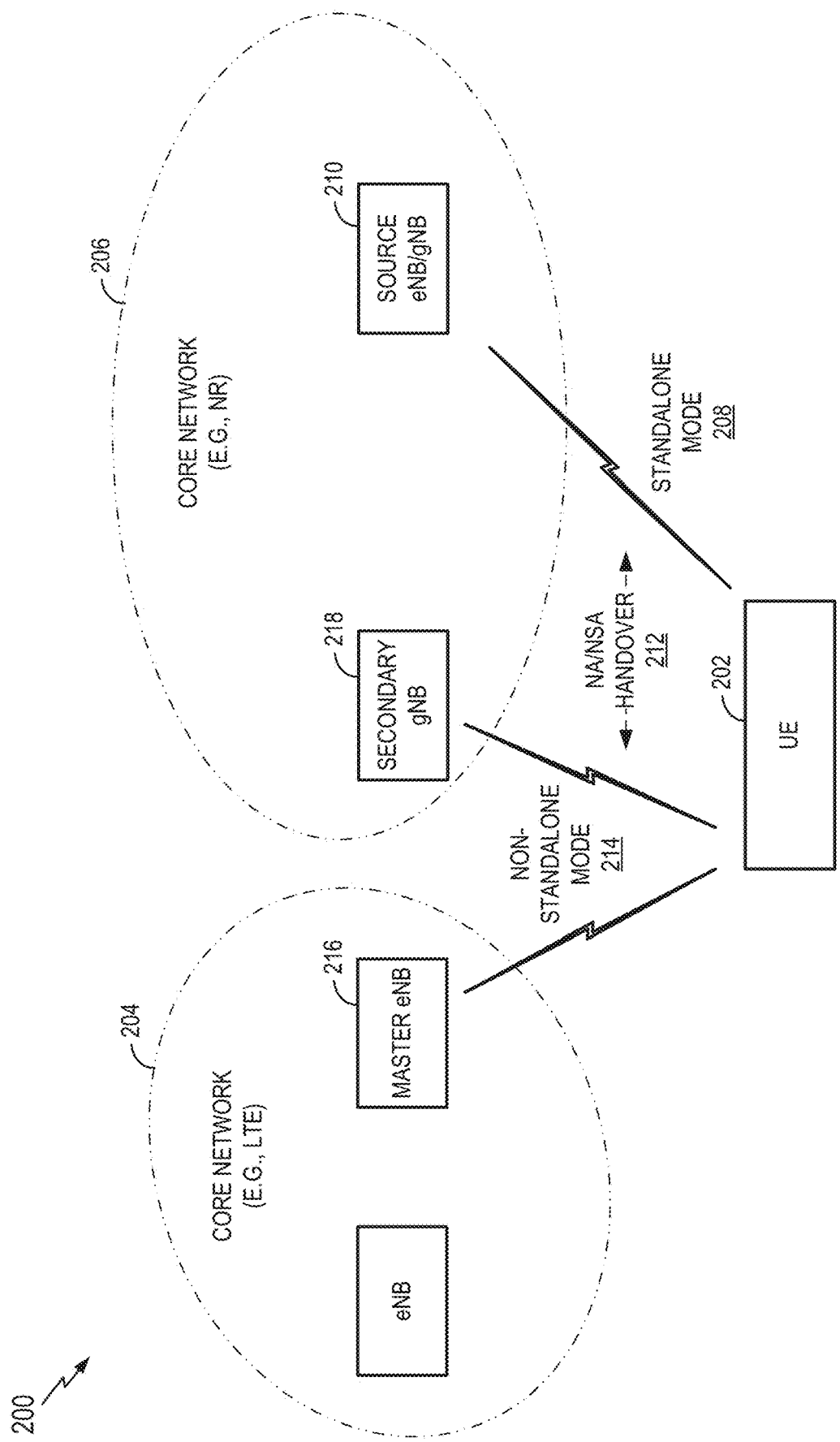
FIG. 2 is a diagram illustrating an example of standalone (SA) to non-standalone (NSA) handover.

FIG. 2 is a schematic illustration of a wireless communication system 200 where a UE 202 may be handed-over from an SA mode to an NSA mode, or vice versa. The wireless communication system 200 includes a first core network 204 (e.g., an LTE network) and a second core network 206 (e.g., an NR network), and potentially other networks (not shown).

In the example, of FIG. 2, the UE 202 may operate in a SA mode 208 whereby the UE 202 is initially connected to a source base station 210 (e.g., an eNB or a gNB) of the second core network 206. At some point in time, the UE 202 may be subject to an inter-network SA to NSA handover 212 (e.g., to obtain a service via the another network).

In the example of FIG. 2, in an NSA mode 214, the UE 202 may connect to a master base station 216 (e.g., an eNB) in the first core network 204 and a secondary base station (e.g., a gNB) 218 in the second core network 206. As discussed herein, in some scenarios, the source base station 210 rather than the base station 218 may be designated as the secondary base station for the NSA mode.

In some implementations, the source base station 210 may correspond to the second cell 106 (e.g., a transmit receive point, a base station, etc.) or some other component of FIG. 1. In some implementations, the master base station 216 may correspond to the first cell 104 (e.g., a transmit receive point, a base station, etc.) or some other component of FIG. 1. In some implementations, the UE 202 may correspond to the first UE 102A, the second UE 102B, or some other component of FIG. 1.

Use Cases of Inter-System Handover Between SA and NSA

SA to NSA inter-system handover may include for, example. Option 2 (NR/5GC) to Option 3 (EN-DC) handover as well as Option 5 (LTE/5GC) to Option 3 (EN-DC) handover. Option 2 to Option 3 handover may be particularly useful. For example, when a UE with an ongoing high-performance demand data service needs to perform a mobile oriented (MO) or mobile terminated (MT) voice call but Voice over NR (VoNR) is not supported by the NR core network, the UE may fall-back to an EPS core network for the voice call while keeping the NR core network as the secondary node (SN) to preserve a good user experience (e.g., by maintaining the ongoing high-performance data service on the NR core network).

NSA to SA inter-system handover includes the reverse of the above scenarios. Again, using voice fallback as an example, after the voice call ends, the network may handover the UE from NSA Option 3 to SA Option 2 to save UE power. In the handover, it is possible that the target node doesn't support DC. Thus, the UE will go back to a SA mode of operation.

Option 2/5 to Option 3 Handover Procedure

Figure 3:
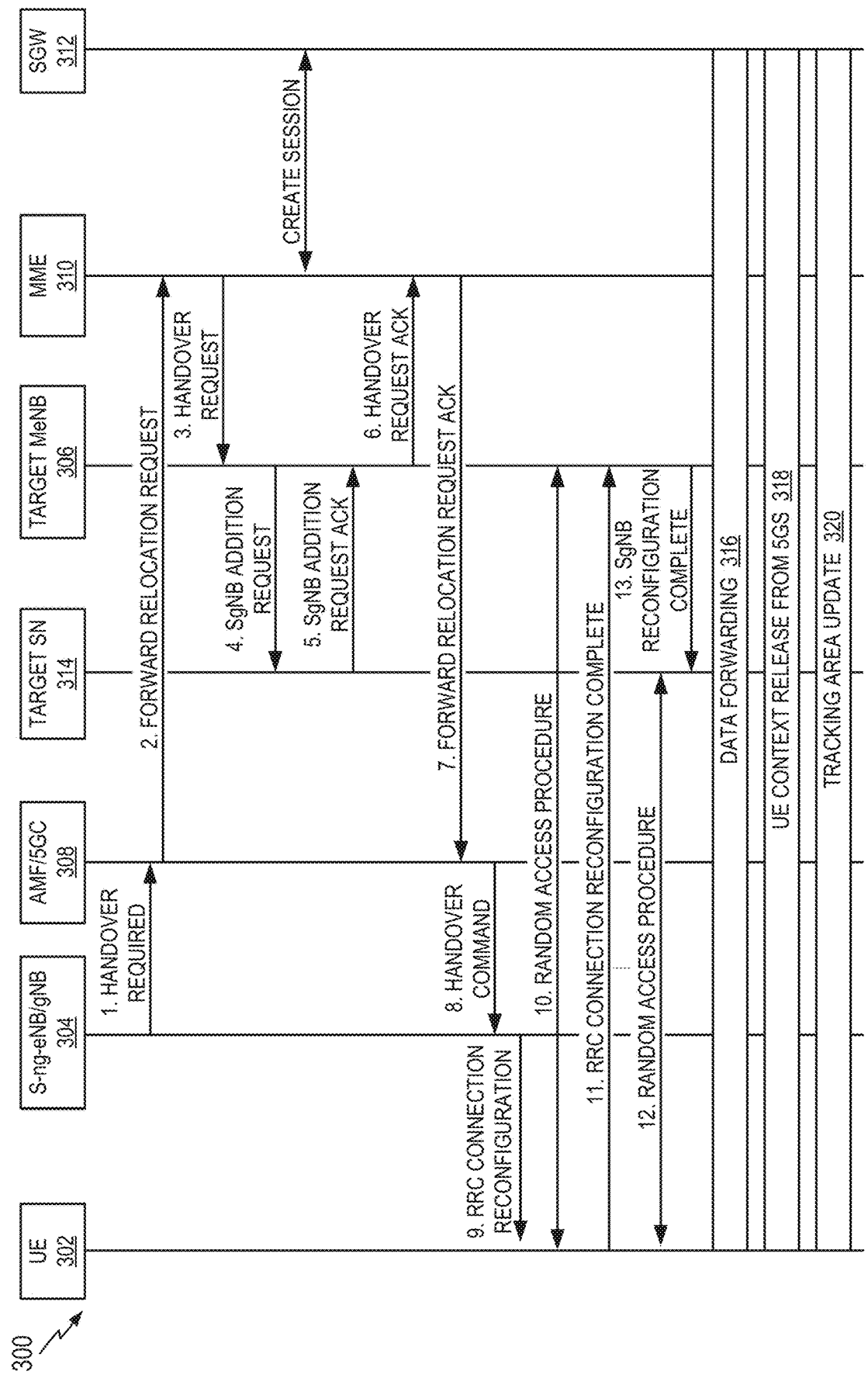
FIG. 3 is a message flow diagram illustrating an example of SA to NSA handover in accordance with some aspects of the disclosure.

FIG. 3 illustrates an example of signaling for an Option 2/5 to Option 3 handover procedure 300 (e.g., an NR/5GC to EN-DC Handover Procedure). Here, Option 2/5 to Option 3 handover may include Option 2 to Option 3 handover and/or Option 5 to Option 3 handover.

In this example, a UE 302 is initially connected to a source base station in an SA mode of operation. The source base station is designated as a Source Next Generation (NG) eNB or gNB (S-ng-eNB/gNB 304) in FIG. 3. The source base station could take other forms in other implementations. The UE 302 is subsequently handed-over to a target base station. The target base station is designated as a Target Master eNB (MeNB) (Target MeNB 306). The target base station could take other forms in other implementations.

At step 1, the S-ng-eNB/gNB 304 starts the handover by initiating a Handover Required procedure (e.g., a Next Generation (NG) Handover Required procedure). For example, the S-ng-eNB/gNB 304 may determine that the UE 302 needs a service (e.g., VoNR) that is not supported by the SA mode of operation.

At step 2, an access and mobility management function (AMF) of the 5GC (designated AMF/5GC 308) sends a Forward Relocation Request to the target mobility management entity (designated MME 310). The MME 310 starts to create a session on the serving gateway (designated SGW 312).

At step 3, the MME 310 sends a Handover Request to the Target MeNB 306 for EN-DC. The Target MeNB 306 determines whether to handover to EN-DC (e.g., based on whether DC is supported by the UE 302 and measurement reports from the UE 302). If handover is indicated, the Target MeNB 306 sends an SgNB Addition Request to the Target SN at step 4. At step 5, the Target SN 314 replies with an SgNB Addition Request Ack. At step 6, the target MeNB 306 replies to the MME 310 with a Handover Request Ack (e.g., including the new configuration information for the UE 302 and the Target SN 314, such as protocol stack information and DC configuration). At step 7, the MME 310 replies to the AMF/5GC 308 with a Relocation Request Ack. At step 8, the AMF/5GC 308 sends a Handover Command to the S-ng-eNB/gNB 304.

At step 9, the S-ng-eNB/gNB 304 triggers the UE 302 to perform the handover and apply the new configuration. For example, the UE 302 may switch from a 5G protocol stack to a 4G protocol stack (e.g., where the 4G and 5G protocol stacks support different types of QoSs) and configure DC (e.g., to accommodate the DC master and secondary roles).

At step 10, the UE 302 synchronizes to the Target MeNB 306 (e.g., by conducting a random access procedure). At step 11, the UE 302 replies to the Target MeNB 306 with RRC Connection Reconfiguration complete message. At step 12, the UE 302 synchronizes to the Target SN 314 (e.g., by conducting a random access procedure). At step 13, if the RRC connection reconfiguration procedure was successful, the Target MeNB 306 informs the Target SN 314 via an SgNB Reconfiguration Complete message.

The system may then perform data forwarding operations 316, context release operations 318, tracking area update operations 320, and other operations as needed.

In some implementations, the S-ng-eNB/gNB 304 may correspond to the second cell 106 (e.g., a transmit receive point, a base station, etc.) or some other component of FIG. 1. In some implementations, the target MeNB 306 may correspond to the first cell 104 (e.g., a transmit receive point, a base station, etc.) or some other component of FIG. 1. In some implementations, the UE 302 may correspond to the first UE 102A, the second UE 102B, or some other component of FIG. 1.

Impact on Data Service

In some aspects, the procedure of FIG. 3 may impact (e.g., interrupt) an ongoing data service. Several examples of the operations that may impact an ongoing data service include: 1) RF/PHY tuning from a source gNB to a target SgNB/MeNB; 2) Random access and Media Access Control, Radio Link Control, Packet Data Convergence Protocol (MAC/RLC/PDCP) re-establishment in the target SN; and 3) Data forwarding (e.g., gNB→MeNB→Target SN).

Alternative Handover Procedure

Figure 4:
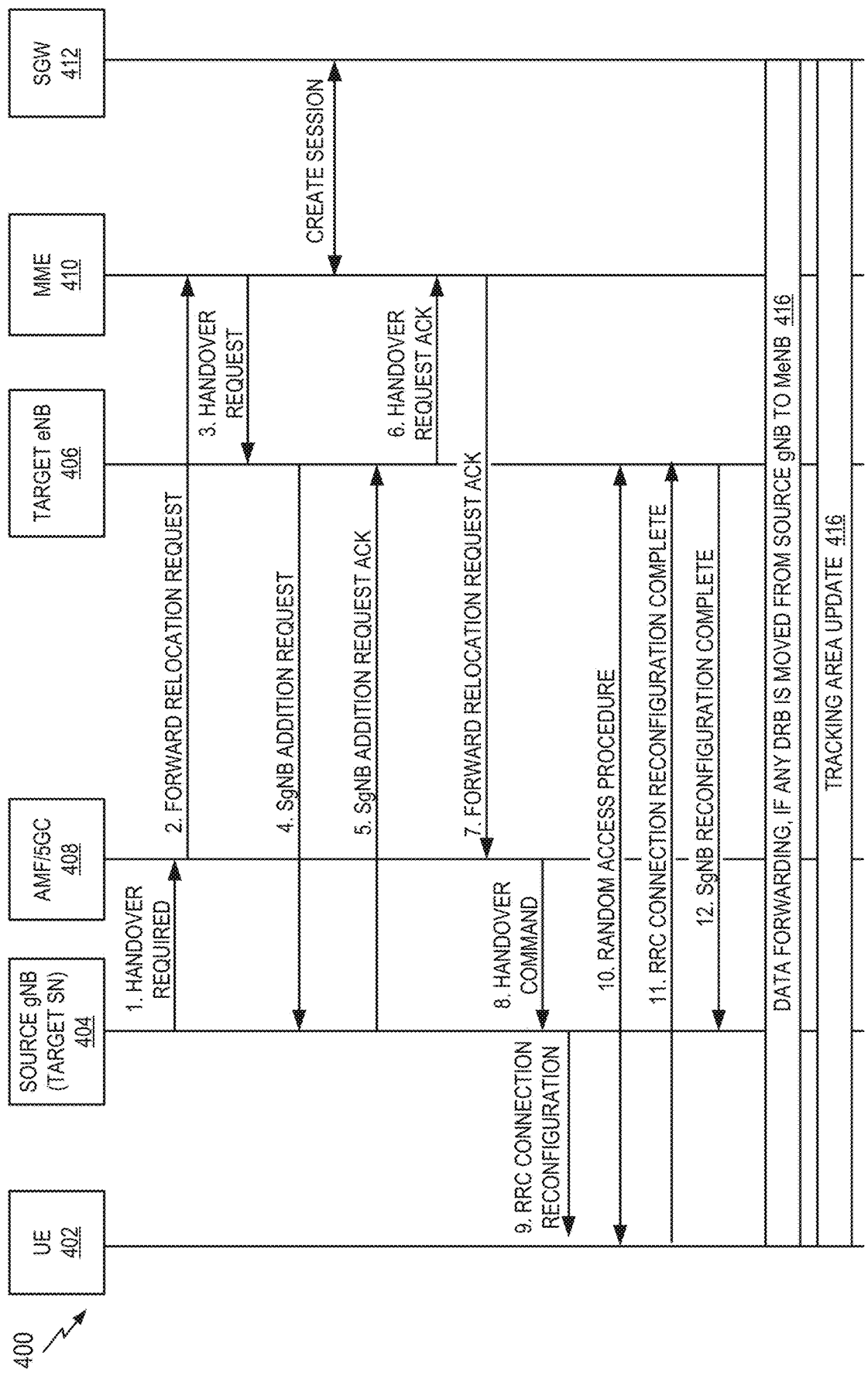
FIG. 4 is a message flow diagram illustrating another example of SA to NSA handover in accordance with some aspects of the disclosure.

FIG. 4 illustrates an example of a handover procedure 400 that may mitigate (e.g., avoid) the impact on data service. In this example, the source gNB is selected as the target SN. Consequently, RF/PHY tuning, random access and MAC/RLC/PDCP re-establishment, the data forwarding associated with selecting the target SN might not be needed.

In this example, a UE 402 is initially connected to a source base station in an SA mode of operation. The source base station is designated as a Source gNB 404 in FIG. 4. The source base station could take other forms in other implementations. The UE 402 is subsequently handed-over to a target base station. The target base station is designated as a Target eNB 406. The target base station could take other forms in other implementations.

At step 1, the Source gNB 404 starts the handover procedure by initiating the Handover Required procedure. In this case, to induce the Target eNB 406 to select the Source gNB 404 as the target SN, the Source gNB 404 may include both an NR measurement result (e.g., candidateCellInfoListNR-r15) and candidate E-UTRA cell information in the RRC container of an NG-AP Handover Required message. The Source gNB 404 could also send a "false" measurement report (e.g., that lists the Target eNB 406 as having the best signal quality) so that the Target eNB 406 will select the Source gNB 404 as the target SN.

At step 2, the AMF/5GC 408 sends a Relocation Request to the target MME 410. The MME 410 starts to create a session on the SGW 412. At step 3, the MME 410 sends a Handover Request to the Target eNB 406. Thus, the Target eNB 406 may receive the RRC container of an NG-AP Handover Required message from step 1. At step 4, the Target eNB 406 sends an SgNB Addition Request to the Source gNB 404 which has been selected as the Target SN. For example, based on one or more of the QoS profile of the enhanced radio access bearers (E-RABs) (e.g., forwarded by step 2 and step 3), the DC capability of the UE 402, the NR measurement result, local policy, or a combination thereof, the Target eNB 406 may decide to configure the target SgNB for the UE 402. The Source gNB 404 may be preferred here based on the NR measurement result in step 1.

To reduce impact to the ongoing data service in NR, one or more of following optimizations may be performed. For data forwarding, the Target eNB 406 may elect to keep the existing data radio bearers (DRBs) in the Source gNB 404. Thus, an MeNB might not have DRB/E-RAB in this case. For security, the Target eNB 406 may elect to not apply the security key change for an SgNB to avoid L2 protocol re-establishment. This may involve the use of an appropriate indicator in step 4 and step 9 to inform the Source gNB 404 and the UE 402, respectively.

At step 5, the Target SN replies with an SgNB Addition Request Ack. At step 6, the Target eNB 406 replies to the MME 410 with a Handover Request Ack. At step 7, the MME 410 replies to the AMF/5GC 408 with a Relocation Request Ack. At step 8, the AMF/5GC 408 sends a Handover Command to the Source gNB 404. At step 9, the Source gNB 404 triggers the UE 402 to perform the handover and apply the new configuration.

At step 10, the UE 402 synchronizes to the Target eNB 406 (e.g., by conducting a random access procedure). At step 11, the UE 402 replies to the Target eNB 406 with an eNB RRC Connection Reconfiguration complete message. Of note, the UE 402 does not need to synchronize to the Target SN in this procedure since the Source gNB 404 is the target SN.

At step 12, if the RRC connection reconfiguration procedure was successful, the Target eNB 406 informs the Target SN of this via an SgNB Reconfiguration Complete message. The system may then perform data forwarding operations 414, tracking area update operations 416, and other operations as needed.

The above procedure can be further optimized to further reduce the handover latency. For example, in step 1, the Handover Required message may include a flag to indicate that this is an Option-2-SA to Option-EN-DC handover where the Source-gNB is to be selected as the SN for EN-DC. As another example, steps 4 and 5 (SgNB-Addition-Request and SgNB Addition Request Ack) can be removed. In this case, the RRC configuration information that would be delivered in step 4 can be included in steps 6, 7, and 8 and sent to the UE 402 by the Source gNB 404 in step 9.

In some implementations, the Source gNB 404 may correspond to the second cell 106 (e.g., a transmit receive point, a base station, etc.) or some other component of FIG. 1. In some implementations, the Target eNB 406 may correspond to the first cell 104 (e.g., a transmit receive point, a base station, etc.) or some other component of FIG. 1. In some implementations, the UE 402 may correspond to the first UE 102A, the second UE 102B, or some other component of FIG. 1.

Option 3 to Option 2/5 Inter-System Handover

Figure 5:
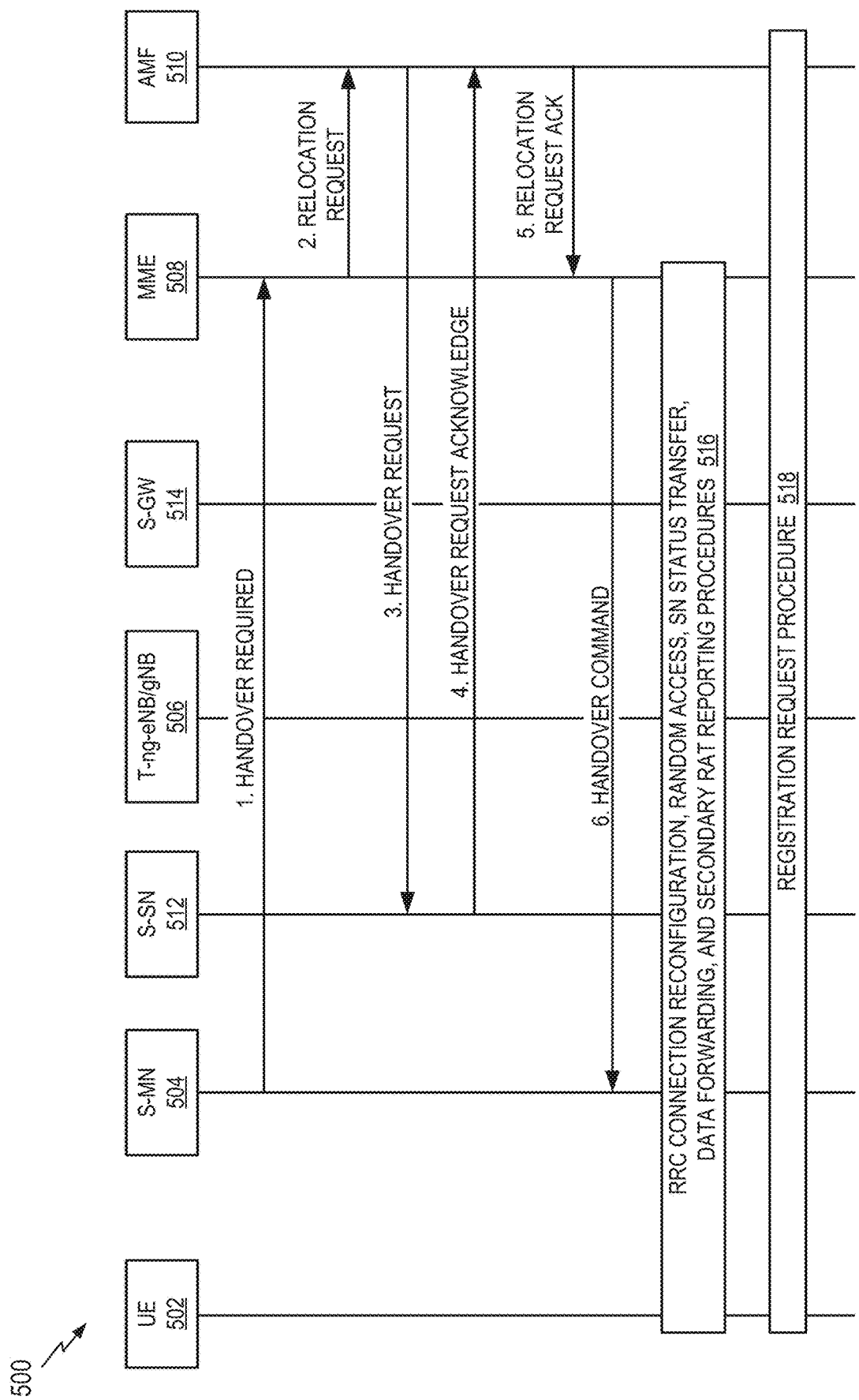
FIG. 5 is a message flow diagram illustrating an example of NSA to SA handover in accordance with some aspects of the disclosure.

FIG. 5 illustrates an example of an Option 3 to Option 2/5 handover procedure 500. In this example, a UE 502 is initially connected to a source base station in an SA mode of operation. The source base station is designated as a Serving Master Node (S-MN 504) in FIG. 5. The source base station could take other forms in other implementations. The UE 502 is subsequently handed-over to a target base station. The target base station is designated as a target Next Generation (NG) eNB or gNB (T-ng-eNB/gNB 506). The target base station could take other forms in other implementations At step 1, the S-MN 504 starts the handover procedure by initiating the Handover Required procedure. Thus, in this example, the S-MN 504 determines that it will initiate an inter-system (e.g., inter-network) handover (e.g., the S-MN 504 may initiate an NSA to SA handover, switching from a 4G network to a 5G network). The handover decision may be based, for example, on the service that caused the Option 2/5 to Option 3 handover having ended (e.g., a VoNR session ended).

At step 2, an MME 508 sends a Relocation Request to an AMF 510. At step 3, the AMF 510 sends a Handover Request to a Serving Secondary Node (S-SN 512). At step 4, the S-SN 512 replies to the AMF 510 with a Handover Request Ack. At step 5, the AMF 510 replies to the MME 508 with a Relocation Request Ack. At step 6, the MME 508 sends a Handover Command to the S-MN 504.

The handover procedure 500 may then involve performing any required RRC connection reconfiguration, random access. SN status transfer, data forwarding, and secondary RAT reporting procedures 516. For example, the procedure 516 may include operations similar to steps 9 11 of FIG. 4. In addition, for SN terminated bearers, the S-SN 512 may send a SN Status transfer to the S-MN 504, which the S-MN 504 then sends to the T-ng-eNB/gNB 506. Also, if applicable, the procedure 516 may include data forwarding from the S-SN 512. In addition, the S-SN 512 sends the Secondary RAT Data Volume Report message to the S-MN 504 and includes the data volumes delivered to the UE 502 over the NR radio for the related E-RABs. The S-MN 504 then sends the Secondary RAT Report message to the MME 508 to provide information on the used NR resource. Finally, a registration request procedure 518 is performed to register the UE 502 with the 5G system and establish user context in the 5G system.

In some implementations, the T-ng-eNB/gNB 506 may correspond to the second cell 106 (e.g., a transmit receive point, a base station, etc.) or some other component of FIG. 1. In some implementations, the S-MN 504 may correspond to the first cell 104 (e.g., a transmit receive point, a base station, etc.) or some other component of FIG. 1. In some implementations, the UE 502 may correspond to the first UE 102A, the second UE 102B, or some other component of FIG. 1.

Example UE Operations

As part of the handover procedure, the UE may maintain both the NSA context (e.g., associated with source) and the SA context (e.g., associated with the target). This will enable the UE to return to the original cell and revert to the original configuration in the event of a handover failure.

In some implementations, the UE may indicate (e.g., via UE Capabilities or via some other indication) whether the UE supports SA/NSA handover. Thus, the network may use this information to determine whether to handover the UE (e.g., from SA to NSA).

Example Optimizations

As discussed above, one or more optimizations may be used in conjunction with the procedures described herein. In EPS fallback with a high quality of service (QoS) demand data service, the source gNB may include both an LTE measurement result and an NR measurement result (or measurement information from other RATs or core networks) in the RRC Container of Handover Required message. Signaling may be defined to allow a gNB and a UE to use a previous security key in NR. For example, a no-key-update indicator may be included in an RRC Connection Reconfiguration message and/or in an SgNB Addition Request message. Random access to the source gNB may be skipped if the source gNB is selected as the target SN. A source gNB to target SN handover indicator may be included in an NG-AP Handover Required message (e.g., to enable the source gNB to explicitly request the optimized Option 2 to Option 3 handover). The SgNB-Addition-Request and the SgNB-Addition-Request-Ack may be omitted, whereby the related RRC configuration information is instead sent in a handover command or some other command.

First Example Apparatus

Figure 6:
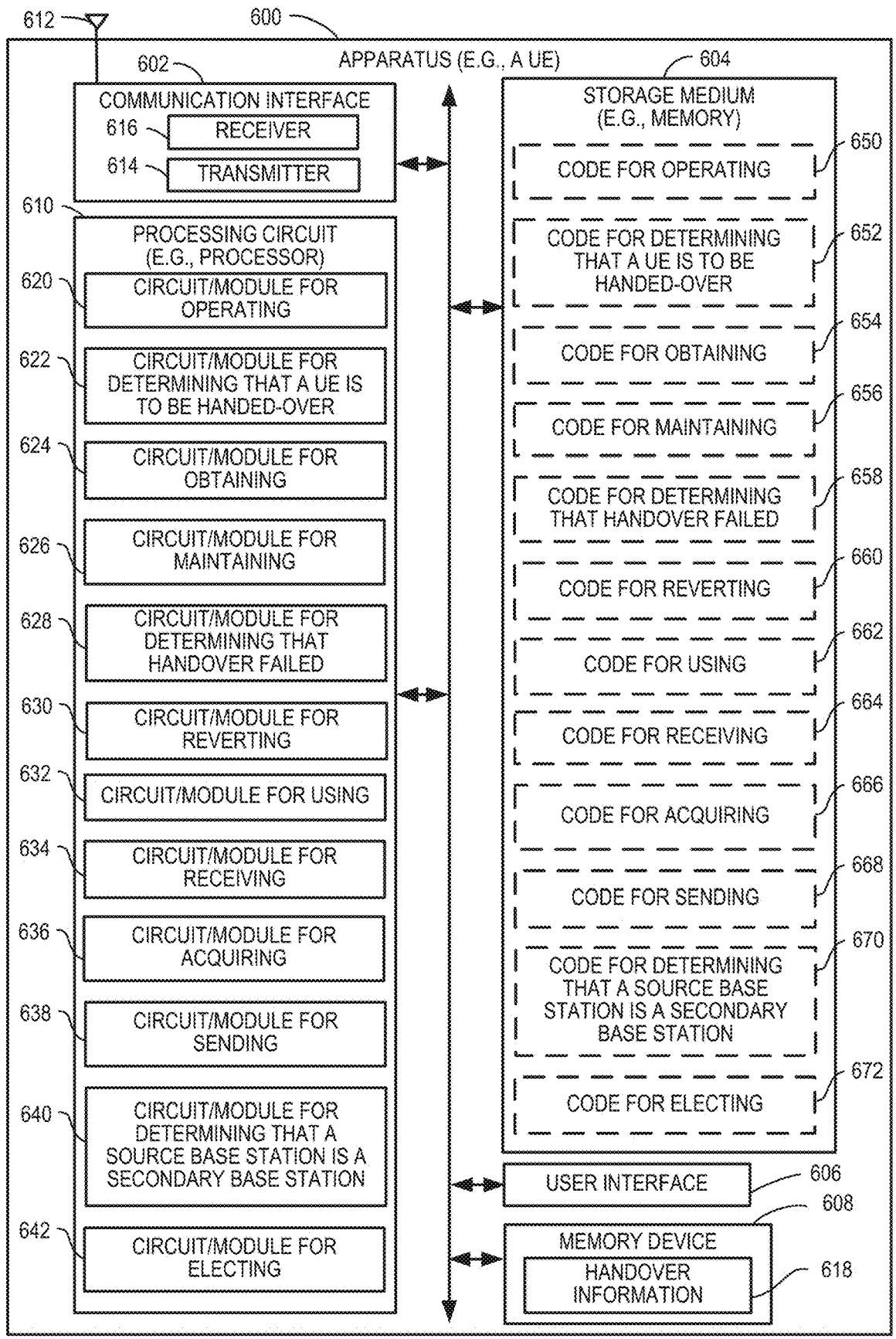
FIG. 6 is a block diagram illustrating an example hardware implementation for an apparatus (e.g., an electronic device) that can support communication in accordance with some aspects of the disclosure.

FIG. 6 illustrates a block diagram of an example hardware implementation of an apparatus 600 configured to communicate according to one or more aspects of the disclosure. The apparatus 600 could embody or be implemented within a UE, a gNB, a transmit receive point (TRP), a base station (BS), an eNode B (eNB), a CPE, or some other type of device that supports wireless communication. In various implementations, the apparatus 600 could embody or be implemented within an access terminal, an access point, or some other type of device. In various implementations, the apparatus 600 could embody or be implemented within a server, a personal computer, a mobile phone, a smart phone, a tablet, a portable computer, a sensor, an alarm, a vehicle, a machine, an entertainment device, a medical device, or any other electronic device having circuitry.

The apparatus 600 includes a communication interface (e.g., at least one transceiver) 602, a storage medium 604, a user interface 606, a memory device (e.g., a memory circuit) 608, and a processing circuit 610 (e.g., at least one processor). In various implementations, the user interface 606 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 6. The signaling bus may include any number of interconnecting buses and bridges depending on the specific application of the processing circuit 610 and the overall design constraints. The signaling bus links together various circuits such that each of the communication interface 602, the storage medium 604, the user interface 606, and the memory device 608 are coupled to and/or in electrical communication with the processing circuit 610. The signaling bus may also link various other circuits (not shown) such as timing sources, peripherals, voltage regulators, and power management circuits, which are well known in the art, and therefore, will not be described any further.

The communication interface 602 provides a means for communicating with other apparatuses over a transmission medium. In some implementations, the communication interface 602 includes circuitry and/or programming adapted to facilitate the communication of information bi-directionally with respect to one or more communication devices in a network. In some implementations, the communication interface 602 is adapted to facilitate wireless communication of the apparatus 600. In these implementations, the communication interface 602 may be coupled to one or more antennas 612 as shown in FIG. 6 for wireless communication within a wireless communication system. In some implementations, the communication interface 602 may be configured for wire-based communication. For example, the communication interface 602 could be a bus interface, a send/receive interface, or some other type of signal interface including drivers, buffers, or other circuitry for outputting and/or obtaining signals (e.g., outputting signal from and/or receiving signals into an integrated circuit). The communication interface 602 can be configured with one or more standalone receivers and/or transmitters, as well as one or more transceivers. In the illustrated example, the communication interface 602 includes a transmitter 614 and a receiver 616. The communication interface 602 serves as one example of a means for receiving and/or means transmitting.

The memory device 608 may represent one or more memory devices. As indicated, the memory device 608 may maintain handover information 618 along with other information used by the apparatus 600. In some implementations, the memory device 608 and the storage medium 604 are implemented as a common memory component. The memory device 608 may also be used for storing data that is manipulated by the processing circuit 610 or some other component of the apparatus 600.

The storage medium 604 may represent one or more computer-readable, machine-readable, and/or processor-readable devices for storing programming, such as processor executable code or instructions (e.g., software, firmware), electronic data, databases, or other digital information. The storage medium 604 may also be used for storing data that is manipulated by the processing circuit 610 when executing programming. The storage medium 604 may be any available media that can be accessed by a general purpose or special purpose processor, including portable or fixed storage devices, optical storage devices, and various other mediums capable of storing, containing or carrying programming.

By way of example and not limitation, the storage medium 604 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 604 may be embodied in an article of manufacture (e.g., a computer program product). By way of example, a computer program product may include a computer-readable medium in packaging materials. In view of the above, in some implementations, the storage medium 604 may be a non-transitory (e.g., tangible) storage medium. For example, the storage medium 604 may be a non-transitory computer-readable medium storing computer-executable code, including code to perform operations as described herein.

The storage medium 604 may be coupled to the processing circuit 610 such that the processing circuit 610 can read information from, and write information to, the storage medium 604. That is, the storage medium 604 can be coupled to the processing circuit 610 so that the storage medium 604 is at least accessible by the processing circuit 610, including examples where at least one storage medium is integral to the processing circuit 610 and/or examples where at least one storage medium is separate from the processing circuit 610 (e.g., resident in the apparatus 600, external to the apparatus 600, distributed across multiple entities, etc.).

Programming stored by the storage medium 604, when executed by the processing circuit 610, causes the processing circuit 610 to perform one or more of the various functions and/or process operations described herein. For example, the storage medium 604 may include operations configured for regulating operations at one or more hardware blocks of the processing circuit 610, as well as to utilize the communication interface 602 for wireless communication utilizing their respective communication protocols.

The processing circuit 610 is generally adapted for processing, including the execution of such programming stored on the storage medium 604. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 610 is arranged to obtain, process and/or send data, control data access and storage, issue commands, and control other desired operations. The processing circuit 610 may include circuitry configured to implement desired programming provided by appropriate media in at least one example. For example, the processing circuit 610 may be implemented as one or more processors, one or more controllers, and/or other structure configured to execute executable programming. Examples of the processing circuit 610 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 610 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 610 are for illustration and other suitable configurations within the scope of the disclosure are also contemplated.

According to one or more aspects of the disclosure, the processing circuit 610 may be adapted to perform any or all of the features, processes, functions, operations and/or routines for any or all of the apparatuses described herein. For example, the processing circuit 610 may be configured to perform any of the steps, functions, and/or processes described with respect to FIGS. 1-5, 7, and 8. As used herein, the term "adapted" in relation to the processing circuit 610 may refer to the processing circuit 610 being one or more of configured, employed, implemented, and/or programmed to perform a particular process, function, operation and/or routine according to various features described herein.

The processing circuit 610 may be a specialized processor, such as an application-specific integrated circuit (ASIC) that serves as a means for (e.g., structure for) carrying out any one of the operations described in conjunction with FIGS. 1-5, 7, and 8. The processing circuit 610 serves as one example of a means for transmitting and/or a means for receiving. In some implementations, the processing circuit 610 may provide and/or incorporate, at least in part, the functionality of one or more of the system components described herein (e.g., the module for SA/NSA handover 114 of FIG. 1).

According to at least one example of the apparatus 600, the processing circuit 610 may include one or more of a circuit/module for operating 620, a circuit/module for determining that a UE is to be handed-over 622, a circuit/module for obtaining 624, a circuit/module for maintaining 626, a circuit/module for determining that handover failed 628, a circuit/module for reverting 630, a circuit/module for using 632, a circuit/module for receiving 634, a circuit/module for acquiring 636, a circuit/module for sending 638, a circuit/module for determining that a source base station is a secondary base station 640, or a circuit/module for electing 642. In various implementations, the circuit/module for operating 620, the circuit/module for determining that a UE is to be handed-over 622, the circuit/module for obtaining 624, the circuit/module for maintaining 626, the circuit/module for determining that handover failed 628, the circuit/module for reverting 630, the circuit/module for using 632, the circuit/module for receiving 634, the circuit/module for acquiring 636, the circuit/module for sending 638, the circuit/module for determining that a source base station is a secondary base station 640, or the circuit/module for electing 642 may provide and/or incorporate, at least in part, the functionality of one or more of the system components described herein (e.g., the module for SA/NSA handover 114 of FIG. 1).

As mentioned above, programming stored by the storage medium 604, when executed by the processing circuit 610, causes the processing circuit 610 to perform one or more of the various functions and/or process operations described herein. For example, the programming may cause the processing circuit 610 to perform the various functions, steps, and/or processes described herein with respect to FIGS. 1-5, 7, and 8 in various implementations. As shown in FIG. 6, the storage medium 604 may include one or more of code for operating 650, code for determining that a UE is to be handed-over 652, code for obtaining 654, code for maintaining 656, code for determining that handover failed 658, code for reverting 660, code for using 662, code for receiving 664, code for acquiring 666, code for sending 668, code for determining that a source base station is a secondary base station 670, or code for electing 672. In various implementations, the code for operating 650, the code for determining that a UE is to be handed-over 652, the code for obtaining 654, the code for maintaining 656, the code for determining that handover failed 658, the code for reverting 660, the code for using 662, the code for receiving 664, the code for acquiring 666, the code for sending 668, the code for determining that a source base station is a secondary base station 670, or the code for electing 672 may be executed or otherwise used to provide the functionality described herein for the circuit/module for operating 620, the circuit/module for determining that a UE is to be handed-over 622, the circuit/module for obtaining 624, the circuit/module for maintaining 626, the circuit/module for determining that handover failed 628, the circuit/module for reverting 630, the circuit/module for using 632, the circuit/module for receiving 634, the circuit/module for acquiring 636, the circuit/module for sending 638, the circuit/module for determining that a source base station is a secondary base station 640, or the circuit/module for electing 642.

The circuit/module for operating 620 may include circuitry and/or programming (e.g., code for operating 650 stored on the storage medium 604) adapted to perform several functions relating to, for example, operating in a particular mode of operation as discussed herein (e.g., based on a determination that the mode of operation provides a request service, etc.). In some aspects, the circuit/module for operating 620 (e.g., a means for operating) may correspond to, for example, a processing circuit.

The circuit/module for determining that a UE is to be handed-over 622 may include circuitry and/or programming (e.g., code for determining that a UE is to be handed-over 652 stored on the storage medium 604) adapted to perform several functions relating to, for example, determining that handover is indicated as discussed herein (e.g., based on a handover trigger, etc.). In some aspects, the circuit/module for determining that a UE is to be handed-over 622 (e.g., a means for determining that a UE is to be handed-over) may correspond to, for example, a processing circuit.

The circuit/module for obtaining 624 may include circuitry and/or programming (e.g., code for obtaining 654 stored on the storage medium 604) adapted to perform several functions relating to, for example, obtaining information as discussed herein (e.g., by retrieving the information from a memory device, by requesting the information from another component, etc.). In some aspects, the circuit/module for obtaining 624 (e.g., a means for obtaining) may correspond to, for example, a processing circuit.

The circuit/module for determining that handover failed 628 may include circuitry and/or programming (e.g., code for determining that handover failed 658 stored on the storage medium 604) adapted to perform several functions relating to, for example, determining that handover a handover was not successful as discussed herein (e.g., based on receipt of a handover failure message, a communication timeout, etc.). In some aspects, the circuit/module for determining that handover failed 628 (e.g., a means for determining that handover failed) may correspond to, for example, a processing circuit.

The circuit/module for reverting 630 may include circuitry and/or programming (e.g., code for reverting 660 stored on the storage medium 604) adapted to perform several functions relating to, for example, reverting to the use of prior context information as discussed herein (e.g., by retrieving the information from a memory device, in response to a handover failure, etc.). In some aspects, the circuit/module for reverting 630 (e.g., a means for reverting) may correspond to, for example, a processing circuit.

The circuit/module for using 632 may include circuitry and/or programming (e.g., code for using 662 stored on the storage medium 604) adapted to perform several functions relating to, for example, using security information as discussed herein (e.g., by retrieving the information from a memory device, verifying that a communication, connection, etc., is authorized, etc.). In some aspects, the circuit/module for using 632 (e.g., a means for using) may correspond to, for example, a processing circuit.

The circuit/module for receiving 634 may include circuitry and/or programming (e.g., code for receiving 664 stored on the storage medium 604) adapted to perform several functions relating to, for example, receiving information. In some scenarios, the circuit/module for receiving 634 may obtain information (e.g., from the communication interface 602, the memory device, or some other component of the apparatus 600) and processes (e.g., decodes) the information. In some scenarios (e.g., if the circuit/module for receiving 634 is or includes an RF receiver), the circuit/module for receiving 634 may receive information directly from a device that transmitted the information. In either case, the circuit/module for receiving 634 may output the obtained information to another component of the apparatus 600 (e.g., the memory device 608, or some other component).

The circuit/module for receiving 634 (e.g., a means for receiving) may take various forms. In some aspects, the circuit/module for receiving 634 may correspond to, for example, an interface (e.g., a bus interface, a send/receive interface, or some other type of signal interface), a communication device, a transceiver, a receiver, or some other similar component as discussed herein. In some implementations, the communication interface 602 includes the circuit/module for receiving 634 and/or the code for receiving 664. In some implementations, the circuit/module for receiving 634 and/or the code for receiving 664 is configured to control the communication interface 602 (e.g., a transceiver or a receiver) to receive information.

The circuit/module for acquiring 636 may include circuitry and/or programming (e.g., code for acquiring 666 stored on the storage medium 604) adapted to perform several functions relating to, for example, acquiring information as discussed herein (e.g., by conducting received signal measurements, by retrieving the information from a memory device, by requesting the information from another component, etc.). In some aspects, the circuit/module for acquiring 636 (e.g., a means for acquiring) may correspond to, for example, a processing circuit.

The circuit/module for sending 638 may include circuitry and/or programming (e.g., code for sending 668 stored on the storage medium 604) adapted to perform several functions relating to, for example, sending (e.g., transmitting) information. In some implementations, the circuit/module for sending 638 may obtain information (e.g., from the circuit/module for acquiring 636, the memory device 608, or some other component of the apparatus 600), process the information (e.g., encode the information for transmission), and send the information to another component (e.g., the transmitter 614, the communication interface 602, or some other component) that will transmit the information to another device. In some scenarios (e.g., if the circuit/module for sending 638 includes a transmitter), the circuit/module for sending 638 transmits the information directly to another device (e.g., the ultimate destination) via radio frequency signaling or some other type of signaling suitable for the applicable communication medium.

The circuit/module for sending 638 (e.g., a means for sending) may take various forms. In some aspects, the circuit/module for sending 638 may correspond to, for example, an interface (e.g., a bus interface, a send/receive interface, or some other type of signal interface), a communication device, a transceiver, a transmitter, or some other similar component as discussed herein. In some implementations, the communication interface 602 includes the circuit/module for sending 638 and/or the code for sending 668. In some implementations, the circuit/module for sending 638 and/or the code for sending 668 is configured to control the communication interface 602 (e.g., a transceiver or a transmitter) to transmit information.

The circuit/module for determining that a source base station is a secondary base station 640 may include circuitry and/or programming (e.g., code for determining that a source base station is a secondary base station 670 stored on the storage medium 604) adapted to perform several functions relating to, for example, determining that a source base station for SA mode is a secondary base station for NSA mode as discussed herein (e.g., based on which node will be the target SN, etc.). In some aspects, the circuit/module for determining that a source base station is a secondary base station 640 (e.g., a means for determining that a source base station is a secondary base station) may correspond to, for example, a processing circuit.

The circuit/module for electing 642 may include circuitry and/or programming (e.g., code for electing 672 stored on the storage medium 604) adapted to perform several functions relating to, for example, electing to not conduct a random access to a secondary base station as discussed herein (e.g., upon determining that a source base station for SA mode is a secondary base station for NSA mode, upon determining that the SN did not change, etc.). In some aspects, the circuit/module for electing 642 (e.g., a means for electing) may correspond to, for example, a processing circuit.

First Example Process

Figure 7:
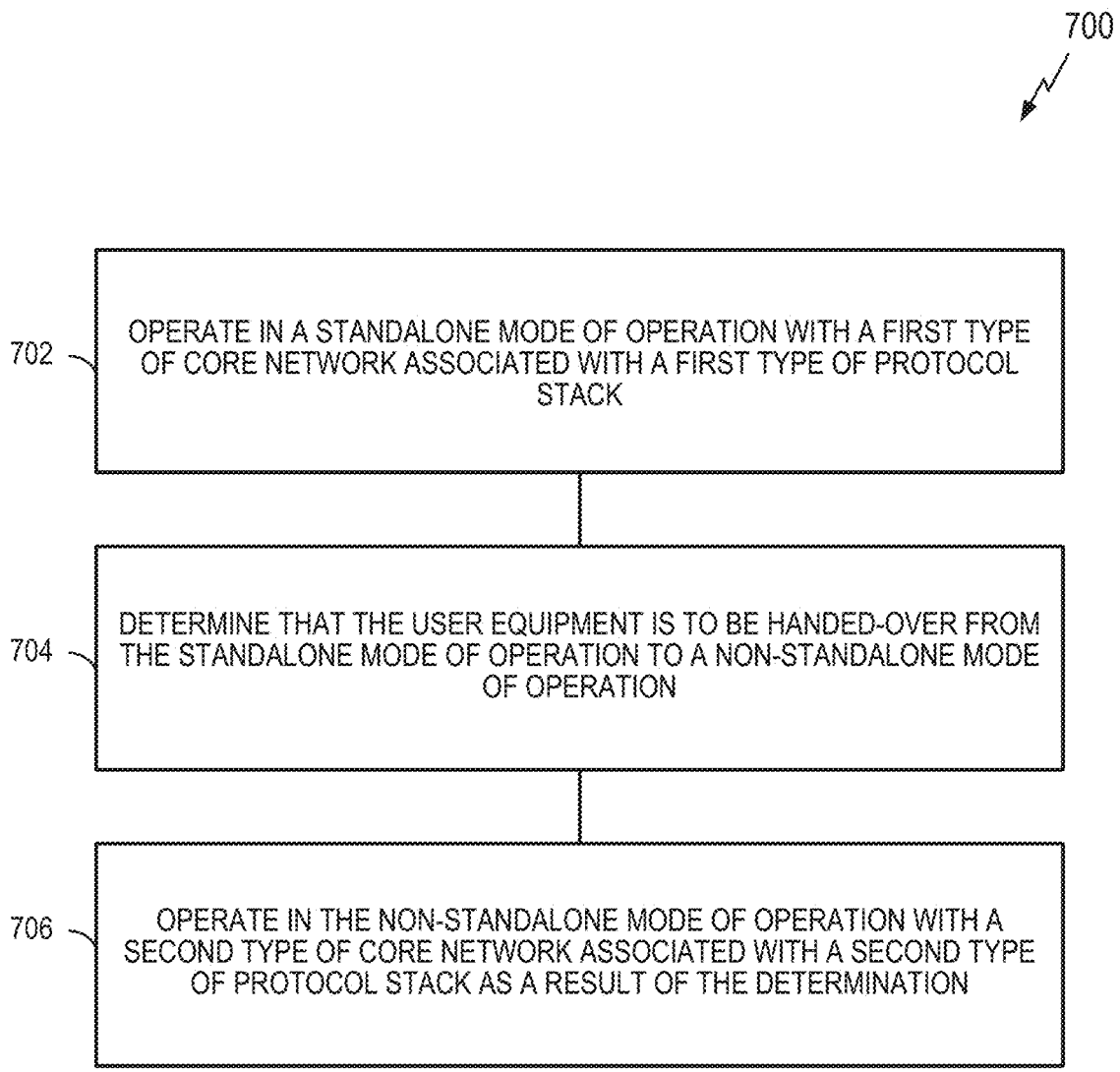
FIG. 7 is a flowchart illustrating an example of a handover process in accordance with some aspects of the disclosure.

FIG. 7 illustrates a process 700 for communication in accordance with some aspects of the disclosure. The process 700 may take place within a processing circuit (e.g., the processing circuit 610 of FIG. 6), which may be located in a UE, a gNB, a BS, an eNB, a CPE, or some other suitable apparatus. Of course, in various aspects within the scope of the disclosure, the process 700 may be implemented by any suitable apparatus capable of supporting communication-related operations.

At block 702, an apparatus (e.g., a UE) operates in a standalone mode of operation with a first type of core network associated with a first type of protocol stack. In some aspects, the first type of core network may be a 3rd Generation Partnership Project (3GPP) 4G core network, i.e., EPC (Evolved Packet Core), a 3GPP 5G core network, i.e., 5GC (5G Core), or another type of network or another type of network. In some aspects, the standalone mode of operation may involve connectivity with a 3rd Generation Partnership Project (3GPP) New Radio (NR) network, connectivity with a 3GPP 5G core network, i.e., 5GC (5G Core), or another type of connectivity.

In some implementations, the circuit/module for operating 620 of FIG. 6 performs the operations of block 702 and/or other similar operations as taught herein. In some implementations, the code for operating 650 of FIG. 6 is executed to perform the operations of block 702 and/or other similar operations as taught herein.

At block 704, the apparatus determines that the apparatus is to be handed-over from the standalone mode of operation to a non-standalone mode of operation. In some aspects, the determination that the apparatus is to be handed-over may include receiving a connection reconfiguration message including non-standalone mode configuration information for the second type of core network. In some aspects, the non-standalone mode of operation may involve dual connectivity with a 3GPP NR network (or another type of network) and at least one other network.

In some implementations, the circuit/module for determining that a UE is to be handed-over 622 of FIG. 6 performs the operations of block 704 and/or other similar operations as taught herein. In some implementations, the code for determining that a UE is to be handed-over 620 of FIG. 6 is executed to perform the operations of block 704 and/or other similar operations as taught herein.

At block 706, the apparatus operates in the non-standalone mode of operation with a second type of core network associated with a second type of protocol stack as a result of the determination. In some aspects, the second type of core network may be a 3rd Generation Partnership Project (3GPP) 4G core network, i.e., EPC (Evolved Packet Core), a 3GPP 5G core network, i.e., 5GC (5G Core), or another type of network.

In some implementations, the circuit/module for operating 620 of FIG. 6 performs the operations of block 706 and/or other similar operations as taught herein. In some implementations, the code for operating 650 of FIG. 6 is executed to perform the operations of block 706 and/or other similar operations as taught herein.

In some aspects, a process in accordance with the teachings herein may include any combination of the above operations.

First Optional Operations

Figure 8:
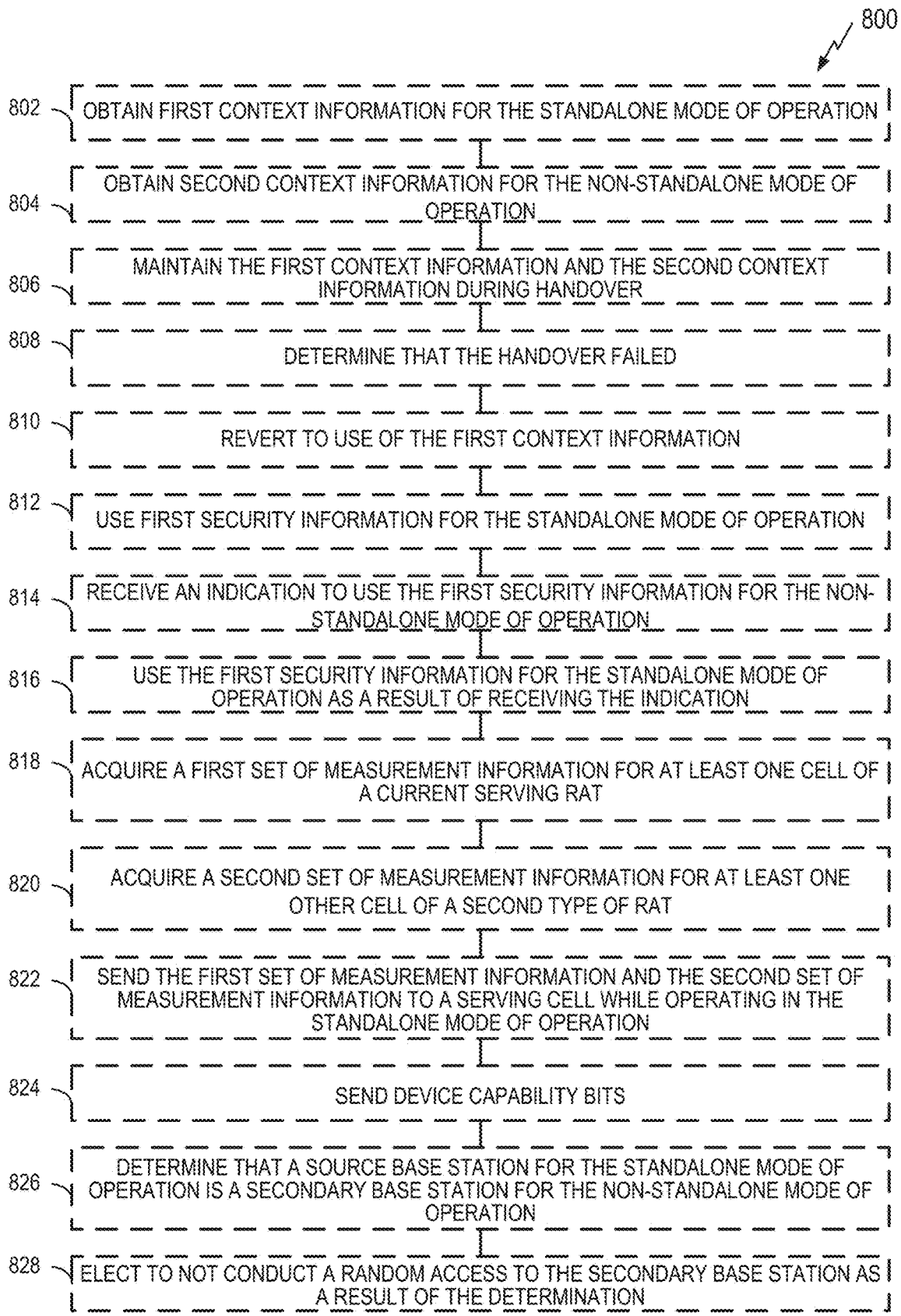
FIG. 8 is a flowchart illustrating example operations that may be performed, for example, in conjunction with the handover process of FIG. 7 in accordance with some aspects of the disclosure.

FIG. 8 illustrates optional operations 800 for communication in accordance with some aspects of the disclosure. In some aspects, the operations 800 may be performed in conjunction with (e.g., as part of or in addition to) the process 700 of FIG. 7. The operations 800 may take place within a processing circuit (e.g., the processing circuit 610 of FIG. 6), which may be located in a UE, a gNB, a BS, an eNB, a CPE, or some other suitable apparatus. Of course, in various aspects within the scope of the disclosure, the operations 800 may be implemented by any suitable apparatus capable of supporting communication-related operations.

At block 802, an apparatus (e.g., a UE) may obtain first context information (e.g., protocol-related information or other context-related information) for the standalone mode of operation. In some implementations, the circuit/module for obtaining 624 of FIG. 6 performs the operations of block 802 and/or other similar operations as taught herein. In some implementations, the code for obtaining 654 of FIG. 6 is executed to perform the operations of block 802 and/or other similar operations as taught herein.

At block 804, the apparatus may obtain second context information for the non-standalone mode of operation. In some implementations, the circuit/module for obtaining 624 of FIG. 6 performs the operations of block 804 and/or other similar operations as taught herein. In some implementations, the code for obtaining 654 of FIG. 6 is executed to perform the operations of block 804 and/or other similar operations as taught herein.

At block 806, the apparatus may maintain the first context information and the second context information during handover from the standalone mode of operation to a non-standalone mode of operation. In some implementations, the circuit/module for maintaining 626 of FIG. 6 performs the operations of block 806 and/or other similar operations as taught herein. In some implementations, the code for maintaining 656 of FIG. 6 is executed to perform the operations of block 806 and/or other similar operations as taught herein.

At block 808, the apparatus may determine that the handover failed. In some implementations, the circuit/module for determining that handover failed 628 of FIG. 6 performs the operations of block 808 and/or other similar operations as taught herein. In some implementations, the code for determining that handover failed 658 of FIG. 6 is executed to perform the operations of block 808 and/or other similar operations as taught herein.

At block 810, the apparatus may revert to use of the first context information as a result of the determination that the handover failed. In some implementations, the circuit/module for reverting 630 of FIG. 6 performs the operations of block 810 and/or other similar operations as taught herein. In some implementations, the code for reverting 660 of FIG. 6 is executed to perform the operations of block 810 and/or other similar operations as taught herein.

At block 812, the apparatus may use first security information for the standalone mode of operation. In some implementations, the circuit/module for using 632 of FIG. 6 performs the operations of block 812 and/or other similar operations as taught herein. In some implementations, the code for using 662 of FIG. 6 is executed to perform the operations of block 812 and/or other similar operations as taught herein.

At block 814, the apparatus may receive an indication to use the first security information for the non-standalone mode of operation. In some aspects, the indication may be received via an addition request message. In some implementations, the circuit/module for receiving 634 of FIG. 6 performs the operations of block 814 and/or other similar operations as taught herein. In some implementations, the code for receiving 664 of FIG. 6 is executed to perform the operations of block 814 and/or other similar operations as taught herein.

At block 816, the apparatus may use the first security information for the non-standalone mode of operation as a result of receiving the indication. In some implementations, the circuit/module for using 632 of FIG. 6 performs the operations of block 816 and/or other similar operations as taught herein. In some implementations, the code for using 662 of FIG. 6 is executed to perform the operations of block 816 and/or other similar operations as taught herein.

At block 818, the apparatus may acquire a first set of measurement information for at least one cell of a current serving Radio Access Technology (RAT). In some implementations, the circuit/module for acquiring 636 of FIG. 6 performs the operations of block 818 and/or other similar operations as taught herein. In some implementations, the code for acquiring 666 of FIG. 6 is executed to perform the operations of block 818 and/or other similar operations as taught herein.

At block 820, the apparatus may acquire a second set of measurement information for at least one other cell of a second type of RAT. In some implementations, the circuit/module for acquiring 636 of FIG. 6 performs the operations of block 820 and/or other similar operations as taught herein. In some implementations, the code for acquiring 666 of FIG. 6 is executed to perform the operations of block 820 and/or other similar operations as taught herein.

At block 822, the apparatus may send the first set of measurement information and the second set of measurement information to a serving cell while operating in the standalone mode of operation. In some implementations, the circuit/module for sending 638 of FIG. 6 performs the operations of block 822 and/or other similar operations as taught herein. In some implementations, the code for sending 668 of FIG. 6 is executed to perform the operations of block 822 and/or other similar operations as taught herein.

At block 824, the apparatus may send device capability bits indicating whether the apparatus supports: handover from SA to NSA, handover from NSA to SA, inter-system handover from SA to NSA, inter-system handover from NSA to SA, or any combination thereof. In some implementations, the circuit/module for sending 638 of FIG. 6 performs the operations of block 824 and/or other similar operations as taught herein. In some implementations, the code for sending 668 of FIG. 6 is executed to perform the operations of block 824 and/or other similar operations as taught herein.

At block 826, the apparatus may determine that a source base station for the standalone mode of operation is a secondary base station for the non-standalone mode of operation. In some implementations, the circuit/module for determining that a source base station is a secondary base station 640 of FIG. 6 performs the operations of block 826 and/or other similar operations as taught herein. In some implementations, the code for determining that a source base station is a secondary base station 670 of FIG. 6 is executed to perform the operations of block 826 and/or other similar operations as taught herein.

At block 828, the apparatus may elect to not conduct a random access to the secondary base station as a result of the determination at block 826 that the source base station for the standalone mode of operation is the secondary base station for the non-standalone mode of operation. In some implementations, the circuit/module for electing 642 of FIG. 6 performs the operations of block 828 and/or other similar operations as taught herein. In some implementations, the code for electing 672 of FIG. 6 is executed to perform the operations of block 828 and/or other similar operations as taught herein.

In some aspects, a process in accordance with the teachings herein may include any combination of the above operations.

Second Example Apparatus

Figure 9:
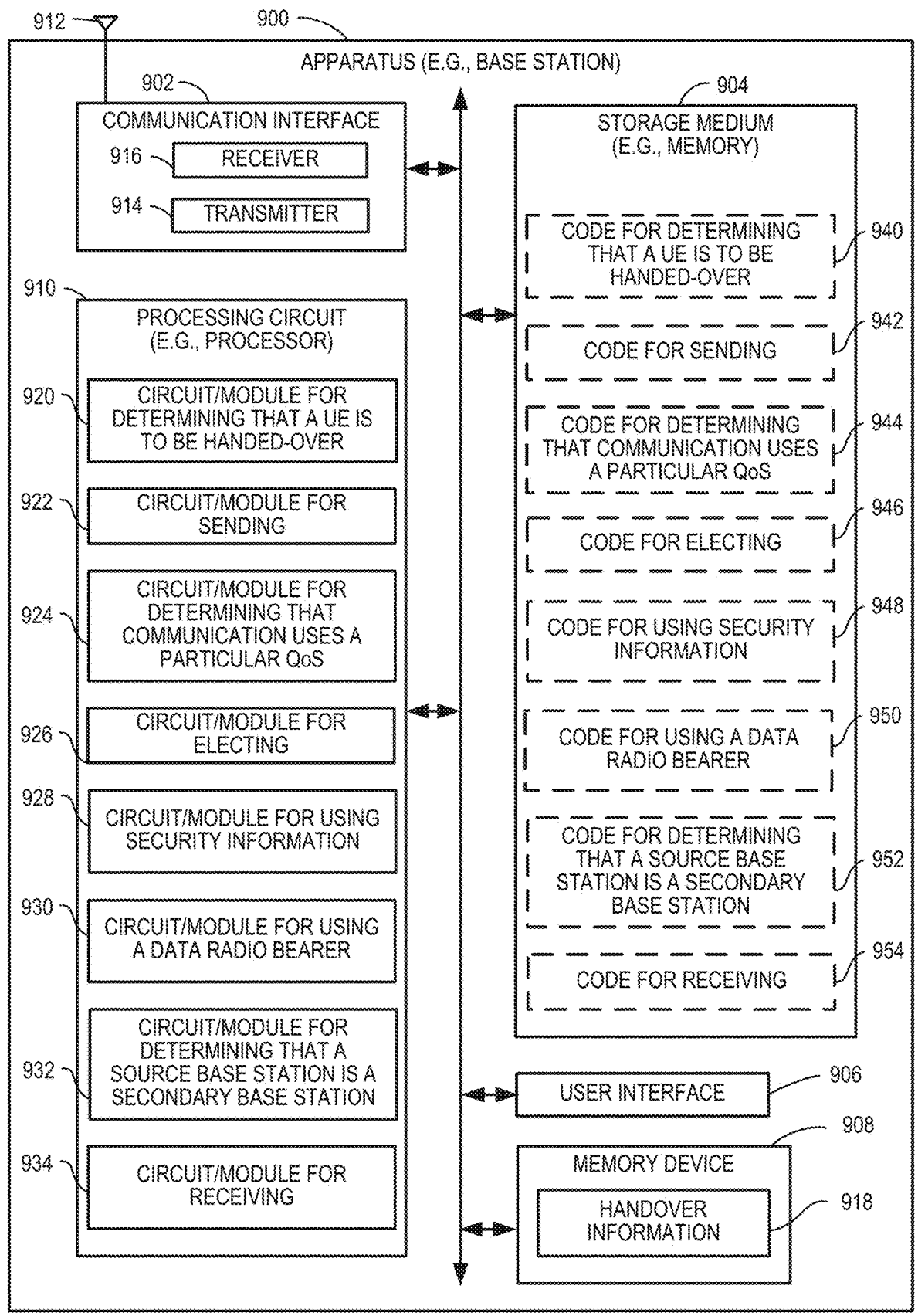
FIG. 9 is a block diagram illustrating an example hardware implementation for another apparatus (e.g., an electronic device) that can support communication in accordance with some aspects of the disclosure.

FIG. 9 illustrates a block diagram of an example hardware implementation of an apparatus 900 configured to communicate according to one or more aspects of the disclosure. The apparatus 900 could embody or be implemented within a gNB, a transmit receive point (TRP), a base station (BS), an eNode B (eNB), a CPE, or some other type of device that supports wireless communication. In various implementations, the apparatus 900 could embody or be implemented within an access terminal, an access point, or some other type of device. In various implementations, the apparatus 900 could embody or be implemented within a server, a personal computer, a mobile phone, a smart phone, a tablet, a portable computer, a sensor, an alarm, a vehicle, a machine, an entertainment device, a medical device, or any other electronic device having circuitry.

The apparatus 900 includes a communication interface 902 (e.g., at least one transceiver), a storage medium 904, a user interface 906, a memory device 908 (e.g., storing handover information 918), and a processing circuit 910 (e.g., at least one processor). In various implementations, the user interface 906 may include one or more of: a keypad, a display, a speaker, a microphone, a touchscreen display, of some other circuitry for receiving an input from or sending an output to a user. The communication interface 902 may be coupled to one or more antennas 912, and may include a transmitter 914 and a receiver 916. In general, the components of FIG. 9 may be similar to corresponding components of the apparatus 600 of FIG. 6.

According to one or more aspects of the disclosure, the processing circuit 910 may be adapted to perform any or all of the features, processes, functions, operations and/or routines for any or all of the apparatuses described herein. For example, the processing circuit 910 may be configured to perform any of the steps, functions, and/or processes described with respect to FIGS. 1-5, 10, and 11. As used herein, the term "adapted" in relation to the processing circuit 910 may refer to the processing circuit 910 being one or more of configured, used, implemented, and/or programmed to perform a particular process, function, operation and/or routine according to various features described herein.

The processing circuit 910 may be a specialized processor, such as an application specific integrated circuit (ASIC) that serves as a means for (e.g., structure for) carrying out any one of the operations described in conjunction with FIGS. 1-5, 10, and 11. The processing circuit 910 may serve as one example of a means for transmitting and/or a means for receiving. In some implementations, the processing circuit 910 may provide and/or incorporate, at least in part, the functionality of one or more of the system components described herein (e.g., the module for SA/NSA handover 116 of FIG. 1).

According to at least one example of the apparatus 900, the processing circuit 910 may include one or more of a circuit/module for determining that a UE is to be handed-over 920, a circuit/module for sending 922, a circuit/module for determining that communication uses a particular QoS 924, a circuit/module for electing 926, a circuit/module for using security information 928, a circuit/module for using a data radio bearer 930, a circuit/module for determining that a source base station is a secondary base station 932, or a circuit/module for receiving 934. In various implementations, the circuit/module for determining that a UE is to be handed-over 920, the circuit/module for sending 922, the circuit/module for determining that communication uses a particular QoS 924, the circuit/module for electing 926, a circuit/module for using security information 928, the circuit/module for using a data radio bearer 930, the circuit/module for determining that a source base station is a secondary base station 932, or the circuit/module for receiving 934 may provide and/or incorporate, at least in part, the functionality of one or more of the system components described herein (e.g., the module for SA/NSA handover 116 of FIG. 1).

As mentioned above, programming stored by the storage medium 904, when executed by the processing circuit 910, causes the processing circuit 910 to perform one or more of the various functions and/or process operations described herein. For example, the programming may cause the processing circuit 910 to perform the various functions, steps, and/or processes described herein with respect to FIGS. 1-5, 10, and 11 in various implementations. As shown in FIG. 9, the storage medium 904 may include one or more of code for determining that a UE is to be handed-over 940, code for sending 942, code for determining that communication uses a particular QoS 944, code for electing 946, code for using security information 948, code for using a data radio bearer 950, code for determining that a source base station is a secondary base station 952, or code for receiving 954. In various implementations, the code for determining that a UE is to be handed-over 940, the code for sending 942, the code for determining that communication uses a particular QoS 944, the code for electing 946, the code for using security information 948, the code for using a data radio bearer 950, the code for determining that a source base station is a secondary base station 952, or the code for receiving 954 may be executed or otherwise used to provide the functionality described herein for the circuit/module for determining that a UE is to be handed-over 920, the circuit/module for sending 922, the circuit/module for determining that communication uses a particular QoS 924, the circuit/module for electing 926, a circuit/module for using security information 928, the circuit/module for using a data radio bearer 930, the circuit/module for determining that a source base station is a secondary base station 932, or the circuit/module for receiving 934.

The circuit/module for determining that a UE is to be handed-over 920 may include circuitry and/or programming (e.g., code for determining that a UE is to be handed-over 950 stored on the storage medium 904) adapted to perform several functions relating to, for example, determining that handover is indicated as discussed herein (e.g., based on a handover trigger, etc.). In some aspects, the circuit/module for determining that a UE is to be handed-over 920 (e.g., a means for determining that a UE is to be handed-over) may correspond to, for example, a processing circuit.

The circuit/module for sending 922 may include circuitry and/or programming (e.g., code for sending 942 stored on the storage medium 904) adapted to perform several functions relating to, for example, sending (e.g., transmitting) information (e.g. a message, an indication, etc.). In some implementations, the circuit/module for sending 922 may obtain information (e.g., from the memory device 908, or some other component of the apparatus 900), process the information (e.g., encode the information for transmission), and send the information to another component (e.g., the transmitter 914, the communication interface 902, or some other component) that will transmit the information to another device. In some scenarios (e.g., if the circuit/module for sending 922 includes a transmitter), the circuit/module for sending 922 transmits the information directly to another device (e.g., the ultimate destination) via radio frequency signaling or some other type of signaling suitable for the applicable communication medium.

The circuit/module for sending 922 (e.g., a means for sending) may take various forms. In some aspects, the circuit/module for sending 922 may correspond to, for example, an interface (e.g., a bus interface, a send/receive interface, or some other type of signal interface), a communication device, a transceiver, a transmitter, or some other similar component as discussed herein. In some implementations, the communication interface 902 includes the circuit/module for sending 922 and/or the code for sending 968. In some implementations, the circuit/module for sending 922 and/or the code for sending 942 is configured to control the communication interface 902 (e.g., a transceiver or a transmitter) to transmit information.

The circuit/module for determining that communication uses a particular QoS 924 may include circuitry and/or programming (e.g., code for determining that communication uses a particular QoS 944 stored on the storage medium 904) adapted to perform several functions relating to, for example, determining that communication by a UE uses a particular QoS as discussed herein (e.g., based on a received grant or other scheduling information, based the requirements of an application, etc.). In some aspects, the circuit/module for determining that communication uses a particular QoS 924 (e.g., a means for determining that communication uses a particular QoS) may correspond to, for example, a processing circuit.

The circuit/module for electing 926 may include circuitry and/or programming (e.g., code for electing 946 stored on the storage medium 904) adapted to perform several functions relating to, for example, electing to include measurement information in a message as discussed herein (e.g., upon determining that an SA/NSA handover or an NSA/SA handover may be performed, etc.). In some aspects, the circuit/module for electing 926 (e.g., a means for electing) may correspond to, for example, a processing circuit.

The circuit/module for using security information 928 may include circuitry and/or programming (e.g., code for using security information 948 stored on the storage medium 904) adapted to perform several functions relating to, for example, using security information as discussed herein (e.g., by retrieving the information from a memory device, verifying that a communication, connection, etc., is authorized, etc.). In some aspects, the circuit/module for using security information 928 (e.g., a means for using security information) may correspond to, for example, a processing circuit.

The circuit/module for using a data radio bearer 930 may include circuitry and/or programming (e.g., code for using a data radio bearer 950 stored on the storage medium 904) adapted to perform several functions relating to, for example, using radio bearers as discussed herein (e.g., by causing information to be sent or received via a scheduled radio bearer, etc.). In some aspects, the circuit/module for using a data radio bearer 930 (e.g., a means for using a data radio bearer) may correspond to, for example, a processing circuit.

The circuit/module for determining that a source base station is a secondary base station 932 may include circuitry and/or programming (e.g., code for determining that a source base station is a secondary base station 952 stored on the storage medium 904) adapted to perform several functions relating to, for example, determining that a source base station for SA mode is a secondary base station for NSA mode as discussed herein (e.g., based on which node will be the target SN, etc.). In some aspects, the circuit/module for determining that a source base station is a secondary base station 932 (e.g., a means for determining that a source base station is a secondary base station) may correspond to, for example, a processing circuit.

The circuit/module for receiving 934 may include circuitry and/or programming (e.g., code for receiving 954 stored on the storage medium 904) adapted to perform several functions relating to, for example, receiving information. In some scenarios, the circuit/module for receiving 934 may obtain information (e.g., from the communication interface 902, the memory device, or some other component of the apparatus 900) and processes (e.g., decodes) the information. In some scenarios (e.g., if the circuit/module for receiving 934 is or includes an RF receiver), the circuit/module for receiving 934 may receive information directly from a device that transmitted the information. In either case, the circuit/module for receiving 934 may output the obtained information to another component of the apparatus 900 (e.g., the memory device 908, or some other component).

The circuit/module for receiving 934 (e.g., a means for receiving) may take various forms. In some aspects, the circuit/module for receiving 934 may correspond to, for example, an interface (e.g., a bus interface, a send/receive interface, or some other type of signal interface), a communication device, a transceiver, a receiver, or some other similar component as discussed herein. In some implementations, the communication interface 902 includes the circuit/module for receiving 934 and/or the code for receiving 954. In some implementations, the circuit/module for receiving 934 and/or the code for receiving 954 is configured to control the communication interface 902 (e.g., a transceiver or a receiver) to receive information.

Second Example Process

Figure 10:
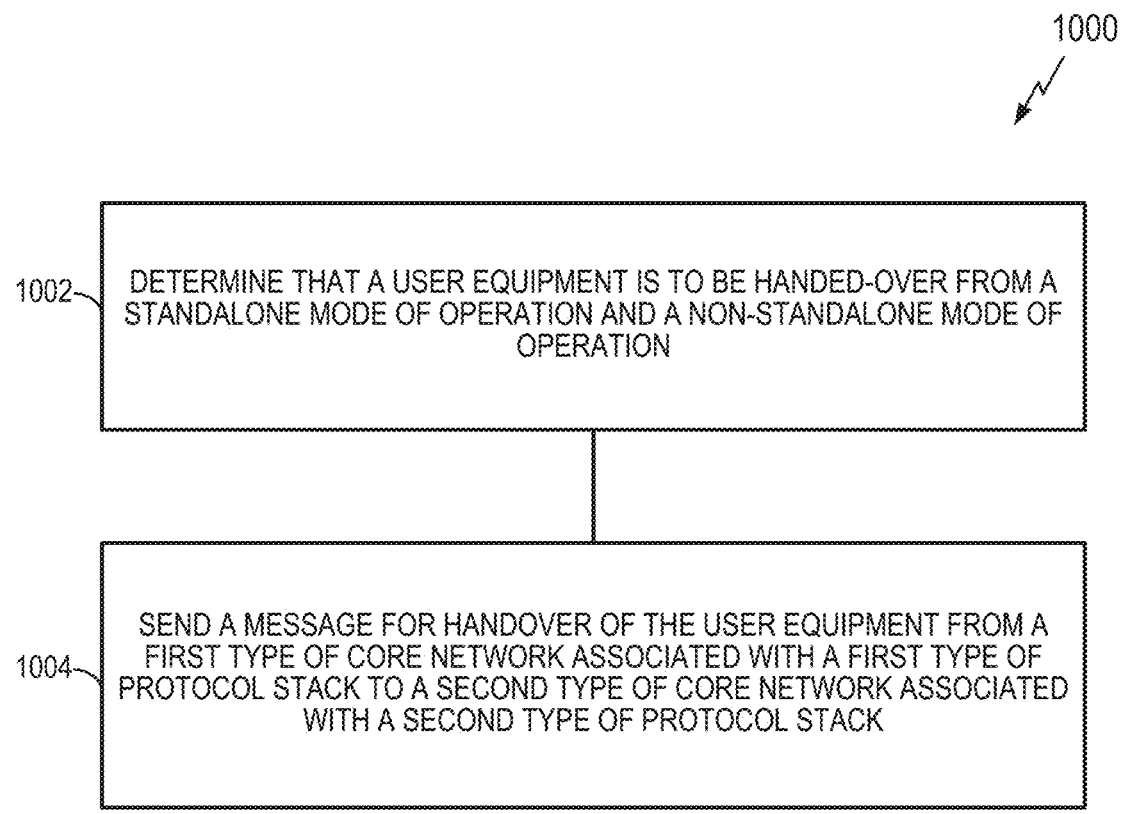
FIG. 10 is a flowchart illustrating another example of a handover process in accordance with some aspects of the disclosure.

FIG. 10 illustrates a process 1000 for communication in accordance with some aspects of the disclosure. The process 1000 may take place within a processing circuit (e.g., the processing circuit 910 of FIG. 9), which may be located in a gNB, a BS, an eNB, a CPE, or some other suitable apparatus. Of course, in various aspects within the scope of the disclosure, the process 1000 may be implemented by any suitable apparatus capable of supporting communication-related operations.

At block 1002, an apparatus (e.g., a base station) determines that a user equipment is to be handed-over from a standalone mode of operation to a non-standalone mode of operation.

In some implementations, the circuit/module for determining that a UE is to be handed-over 920 of FIG. 9 performs the operations of block 1002 and/or other similar operations as taught herein. In some implementations, the code for determining that a UE is to be handed-over 940 of FIG. 9 is executed to perform the operations of block 1002 and/or other similar operations as taught herein.

At block 1004, the apparatus sends a message for handover of the user equipment from a first type of core network associated with a first type of protocol stack to a second type of core network associated with a second type of protocol stack as a result of the determination that the user equipment is to be handed-over.

In some implementations, the circuit/module for sending 922 of FIG. 9 performs the operations of block 1004 and/or other similar operations as taught herein. In some implementations, the code for sending 942 of FIG. 9 is executed to perform the operations of block 1004 and/or other similar operations as taught herein.

In some aspects, a process in accordance with the teachings herein may include any combination of the above operations.

Second Optional Operations

Figure 11:
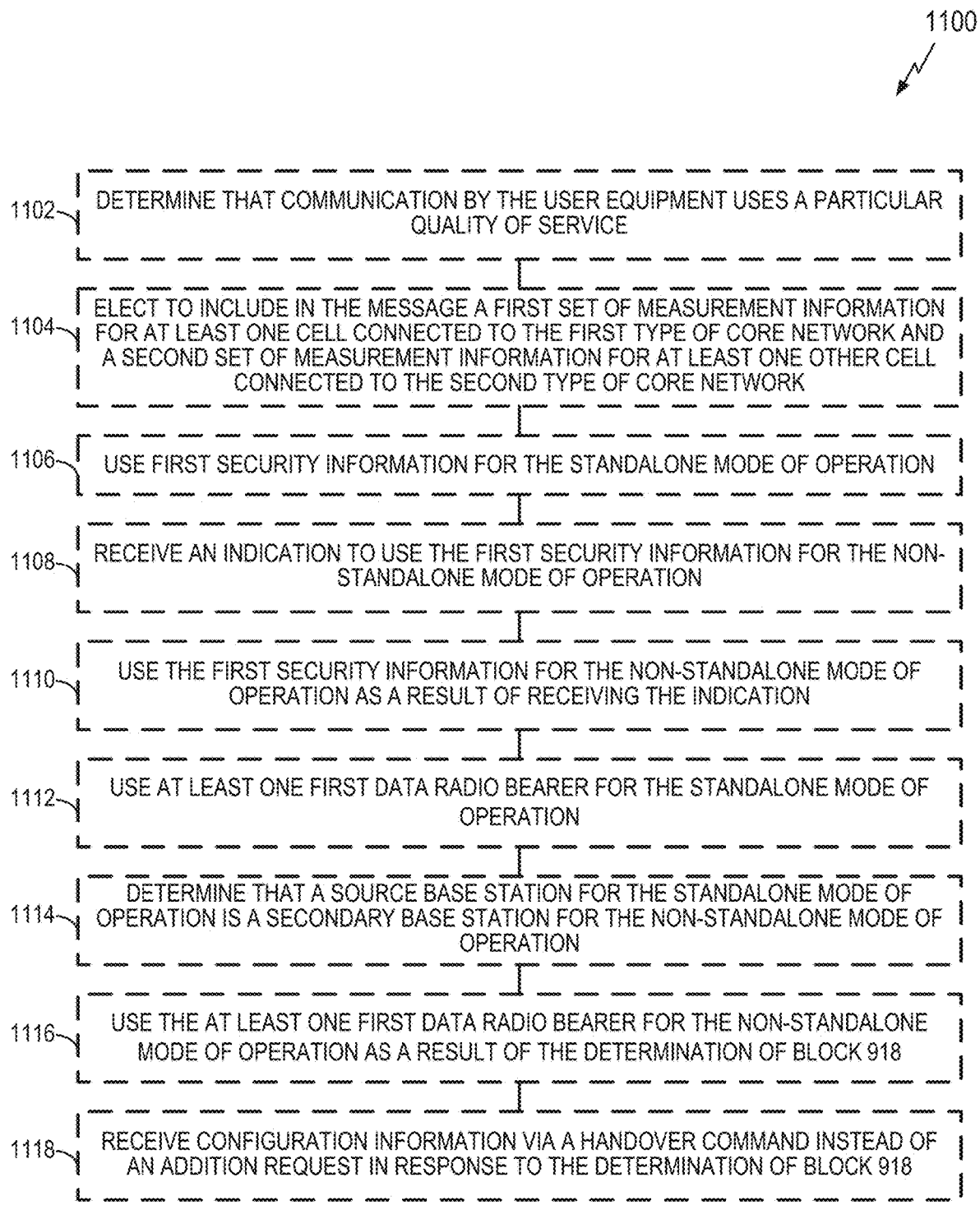
FIG. 11 is a flowchart illustrating example operations that may be performed, for example, in conjunction with the handover process of FIG. 10 in accordance with some aspects of the disclosure.

FIG. 11 illustrates optional operations 1100 for communication in accordance with some aspects of the disclosure. In some aspects, the operations 1100 may be performed in conjunction with (e.g., as part of or in addition to) the process 1000 of FIG. 10. The operations 1100 may take place within a processing circuit (e.g., the processing circuit 910 of FIG. 9), which may be located in a gNB, a BS, an eNB, a CPE, or some other suitable apparatus. Of course, in various aspects within the scope of the disclosure, the operations 1100 may be implemented by any suitable apparatus capable of supporting communication-related operations.

At block 1102, an apparatus (e.g., a base station) may determine that communication by the user equipment uses a particular quality of service. In some aspects, the particular quality of service may include (e.g., may be) a high performance quality of service.

In some implementations, the circuit/module for determining that communication uses a particular QoS 924 of FIG. 9 performs the operations of block 1102 and/or other similar operations as taught herein. In some implementations, the code for determining that communication uses a particular QoS 944 of FIG. 9 is executed to perform the operations of block 1102 and/or other similar operations as taught herein.

At block 1104, the apparatus may elect to include in a message (e.g, the message of block 1004) a first set of measurement information for at least one cell connected to the first type of core network and a second set of measurement information for at least one other cell connected to the second type of core network. In some aspects, the election may be based on the determination that the communication by the user equipment uses a particular quality of service.

In some aspects, the message may include (e.g., may be) an indication that a serving base station for the standalone mode of operation is to be a secondary base station for the non-standalone mode of operation. In some aspects, the message may include (e.g., may be) a handover required message.

In some implementations, the circuit/module for electing 926 of FIG. 9 performs the operations of block 1104 and/or other similar operations as taught herein. In some implementations, the code for electing 946 of FIG. 9 is executed to perform the operations of block 1104 and/or other similar operations as taught herein.

At block 1106, the apparatus may use first security information for the standalone mode of operation. In some implementations, the circuit/module for using security information 928 of FIG. 9 performs the operations of block 1106 and/or other similar operations as taught herein. In some implementations, the code for using security information 948 of FIG. 9 is executed to perform the operations of block 1106 and/or other similar operations as taught herein.

At block 1108, the apparatus may receive an indication to use the first security information for the non-standalone mode of operation. In some aspects, the indication may be received via an addition request message. In some implementations, the circuit/module for receiving 934 of FIG. 9 performs the operations of block 1108 and/or other similar operations as taught herein. In some implementations, the code for receiving 954 of FIG. 9 is executed to perform the operations of block 1108 and/or other similar operations as taught herein.

At block 1110, the apparatus may use the first security information for the non-standalone mode of operation as a result of receiving the indication. In some implementations, the circuit/module for using securing information 928 of FIG. 9 performs the operations of block 1110 and/or other similar operations as taught herein. In some implementations, the code for using security information 948 of FIG. 9 is executed to perform the operations of block 1110 and/or other similar operations as taught herein.

At block 1112, the apparatus may use at least one first data radio bearer for the standalone mode of operation. In some implementations, the circuit/module for using a data radio bearer 930 of FIG. 9 performs the operations of block 1112 and/or other similar operations as taught herein. In some implementations, the code for using a data radio bearer 950 of FIG. 9 is executed to perform the operations of block 1112 and/or other similar operations as taught herein.

At block 1114, the apparatus may determine that a source base station for the standalone mode of operation is a secondary base station for the non-standalone mode of operation. In some implementations, the circuit/module for determining that a source base station is a secondary base station 932 of FIG. 9 performs the operations of block 1114 and/or other similar operations as taught herein. In some implementations, the code for determining that a source base station is a secondary base station 952 of FIG. 9 is executed to perform the operations of block 1114 and/or other similar operations as taught herein.

At block 1116, the apparatus may use the at least one first data radio bearer for the non-standalone mode of operation as a result of the determination at block 1114 that the source base station for the standalone mode of operation is the secondary base station for the non-standalone mode of operation. In some implementations, the circuit/module for using a data radio bearer 930 of FIG. 9 performs the operations of block 1116 and/or other similar operations as taught herein. In some implementations, the code for using a data radio bearer 950 of FIG. 9 is executed to perform the operations of block 1116 and/or other similar operations as taught herein.

At block 1118, the apparatus may receive configuration information via a handover command instead of an addition request in response to the determination at block 1114 that the source base station for the standalone mode of operation is the secondary base station for the non-standalone mode of operation. In some implementations, the circuit/module for receiving 934 of FIG. 9 performs the operations of block 1118 and/or other similar operations as taught herein. In some implementations, the code for receiving 954 of FIG. 9 is executed to perform the operations of block 1118 and/or other similar operations as taught herein.

In some aspects, a process in accordance with the teachings herein may include any combination of the above operations.

Third Example Apparatus

Figure 12:
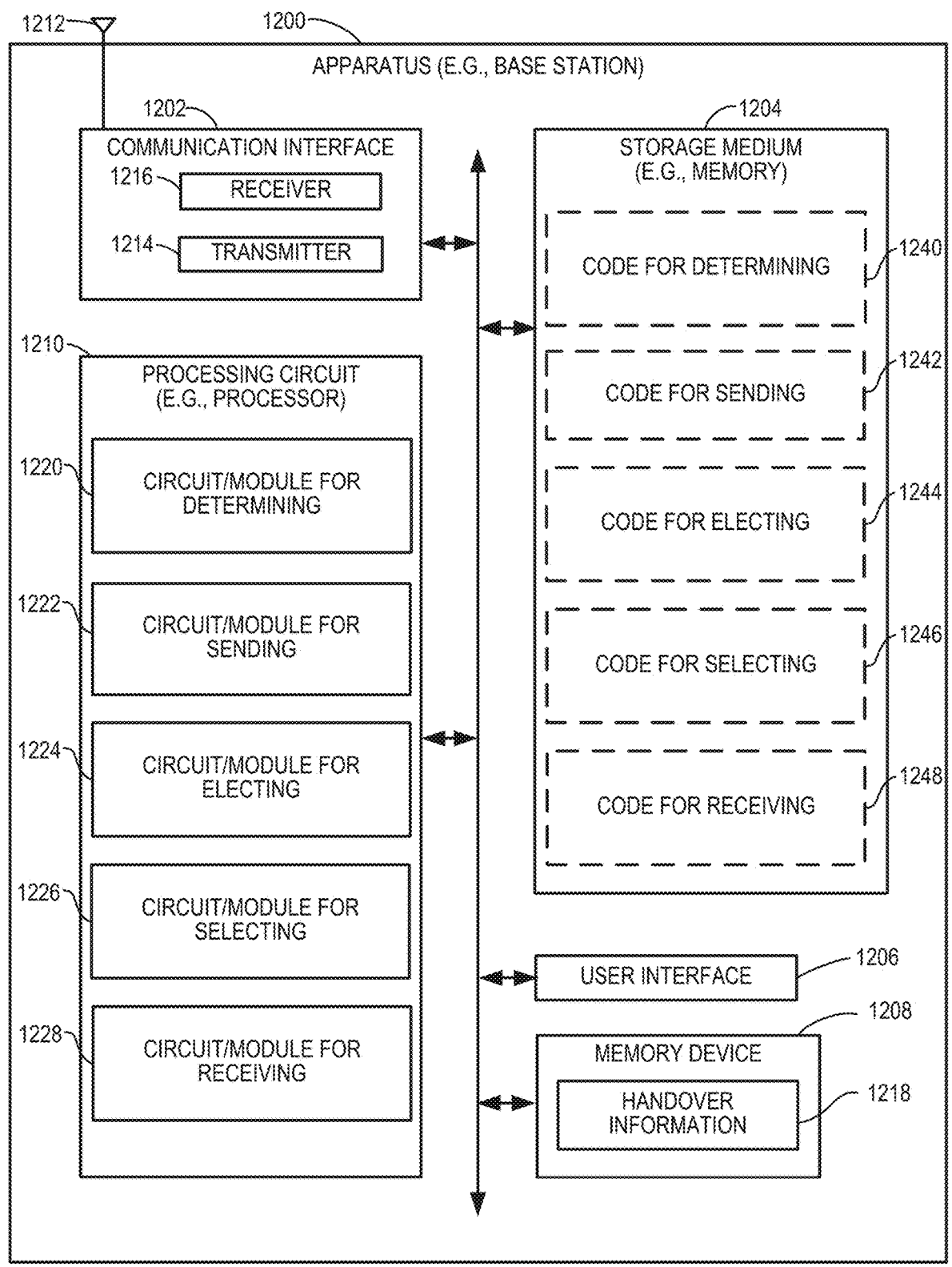
FIG. 12 is a block diagram illustrating an example hardware implementation for another apparatus (e.g., an electronic device) that can support communication in accordance with some aspects of the disclosure.

FIG. 12 illustrates a block diagram of an example hardware implementation of an apparatus 1200 configured to communicate according to one or more aspects of the disclosure. The apparatus 1200 could embody or be implemented within a gNB, a transmit receive point (TRP), a base station (BS), an eNode B (eNB), a CPE, or some other type of device that supports wireless communication. In various implementations, the apparatus 1200 could embody or be implemented within an access terminal, an access point, or some other type of device. In various implementations, the apparatus 1200 could embody or be implemented within a server, a personal computer, a mobile phone, a smart phone, a tablet, a portable computer, a sensor, an alarm, a vehicle, a machine, an entertainment device, a medical device, or any other electronic device having circuitry.

The apparatus 1200 includes a communication interface 1202 (e.g., at least one transceiver), a storage medium 1204, a user interface 1206, a memory device 1208 (e.g., storing handover information 1218), and a processing circuit 1210 (e.g., at least one processor). In various implementations, the user interface 1206 may include one or more of: a keypad, a display, a speaker, a microphone, a touchscreen display, of some other circuitry for receiving an input from or sending an output to a user. The communication interface 1202 may be coupled to one or more antennas 1212, and may include a transmitter 1214 and a receiver 1216. In general, the components of FIG. 12 may be similar to corresponding components of the apparatus 600 of FIG. 6.

According to one or more aspects of the disclosure, the processing circuit 1210 may be adapted to perform any or all of the features, processes, functions, operations and/or routines for any or all of the apparatuses described herein. For example, the processing circuit 1210 may be configured to perform any of the steps, functions, and/or processes described with respect to FIGS. 1-5 and 13. As used herein, the term "adapted" in relation to the processing circuit 1210 may refer to the processing circuit 1210 being one or more of configured, used, implemented, and/or programmed to perform a particular process, function, operation and/or routine according to various features described herein (e.g., the module for SA/NSA handover 116 of FIG. 1).

The processing circuit 1210 may be a specialized processor, such as an application specific integrated circuit (ASIC) that serves as a means for (e.g., structure for) carrying out any one of the operations described in conjunction with FIGS. 1-5 and 13. The processing circuit 1210 may serve as one example of a means for transmitting and/or a means for receiving. In some implementations, the processing circuit 1210 may provide and/or incorporate, at least in part, the functionality of one or more of the system components described herein (e.g., the module for SA/NSA handover 116 of FIG. 1).

According to at least one example of the apparatus 1200, the processing circuit 1210 may include one or more of a circuit/module for determining 1220, a circuit/module for sending 1222, a circuit/module for electing 1224, a circuit/module for selecting 1226, or a circuit/module for receiving 1228. In various implementations, the circuit/module for determining 1220, the circuit/module for sending 1222, the circuit/module for electing 1224, the circuit/module for selecting 1226, or the circuit/module for receiving 1228 may provide and/or incorporate, at least in part, the functionality of one or more of the system components described herein.

As mentioned above, programming stored by the storage medium 1204, when executed by the processing circuit 1210, causes the processing circuit 1210 to perform one or more of the various functions and/or process operations described herein. For example, the programming may cause the processing circuit 1210 to perform the various functions, steps, and/or processes described herein with respect to FIGS. 1-5 and 13 in various implementations. As shown in FIG. 12, the storage medium 1204 may include one or more of code for determining 1240, code for sending 1242, code for electing 1244, code for selecting 1246, or code for receiving 1248. In various implementations, the code for determining 1240, the code for sending 1242, the code for electing 1244, the code for selecting 1246, or the code for receiving 1248 may be executed or otherwise used to provide the functionality described herein for the circuit/module for determining 1220, the circuit/module for sending 1222, the circuit/module for electing 1224, the circuit/module for selecting 1226, or the circuit/module for receiving 1228.

The circuit/module for determining 1220 may include circuitry and/or programming (e.g., code for determining 1240 stored on the storage medium 1204) adapted to perform several functions relating to, for example, determining that handover is indicated as discussed herein (e.g., based on a handover trigger, etc.). In some aspects, the circuit/module for determining 1220 (e.g., a means for determining) may correspond to, for example, a processing circuit.

The circuit/module for sending 1222 may include circuitry and/or programming (e.g., code for sending 1242 stored on the storage medium 1204) adapted to perform several functions relating to, for example, sending (e.g., transmitting) information (e.g. a message, an indication, etc.). In some implementations, the circuit/module for sending 1222 may obtain information (e.g., from the memory device 1208, or some other component of the apparatus 1200), process the information (e.g., encode the information for transmission), and send the information to another component (e.g., the transmitter 1214, the communication interface 1202, or some other component) that will transmit the information to another device. In some scenarios (e.g., if the circuit/module for sending 1222 includes a transmitter), the circuit/module for sending 1222 transmits the information directly to another device (e.g., the ultimate destination) via radio frequency signaling or some other type of signaling suitable for the applicable communication medium.

The circuit/module for sending 1222 (e.g., a means for sending) may take various forms. In some aspects, the circuit/module for sending 1222 may correspond to, for example, an interface (e.g., a bus interface, a send/receive interface, or some other type of signal interface), a communication device, a transceiver, a transmitter, or some other similar component as discussed herein. In some implementations, the communication interface 1202 includes the circuit/module for sending 1222 and/or the code for sending 1242. In some implementations, the circuit/module for sending 1222 and/or the code for sending 1242 is configured to control the communication interface 1202 (e.g., a transceiver or a transmitter) to transmit information.

The circuit/module for electing 1224 may include circuitry and/or programming (e.g., code for electing 1244 stored on the storage medium 1204) adapted to perform several functions relating to, for example, electing to send configuration information to a serving base station as discussed herein (e.g., upon selecting a serving base station for SA as a secondary base station for NSA, etc.). In some aspects, the circuit/module for electing 1224 (e.g., a means for electing) may correspond to, for example, a processing circuit.

The circuit/module for selecting 1226 may include circuitry and/or programming (e.g., code for selecting 1246 stored on the storage medium 1204) adapted to perform several functions relating to, for example, selecting a serving base station for SA as a secondary base station for NSA as discussed herein (e.g., upon determining that the serving base station provides better QoS for a particular communication, etc.). In some aspects, the circuit/module for selecting 1226 (e.g., a means for selecting) may correspond to, for example, a processing circuit.

The circuit/module for receiving 1228 may include circuitry and/or programming (e.g., code for receiving 1248 stored on the storage medium 1204) adapted to perform several functions relating to, for example, receiving information. In some scenarios, the circuit/module for receiving 1228 may obtain information (e.g., from the communication interface 1202, the memory device, or some other component of the apparatus 1200) and processes (e.g., decodes) the information. In some scenarios (e.g., if the circuit/module for receiving 1228 is or includes an RF receiver), the circuit/module for receiving 1228 may receive information directly from a device that transmitted the information. In either case, the circuit/module for receiving 1228 may output the obtained information to another component of the apparatus 1200 (e.g., the memory device 1208, or some other component).

The circuit/module for receiving 1228 (e.g., a means for receiving) may take various forms. In some aspects, the circuit/module for receiving 1228 may correspond to, for example, an interface (e.g., a bus interface, a send/receive interface, or some other type of signal interface), a communication device, a transceiver, a receiver, or some other similar component as discussed herein. In some implementations, the communication interface 1202 includes the circuit/module for receiving 1228 and/or the code for receiving 1248. In some implementations, the circuit/module for receiving 1228 and/or the code for receiving 1248 is configured to control the communication interface 1202 (e.g., a transceiver or a receiver) to receive information.

Third Example Process

Figure 13:
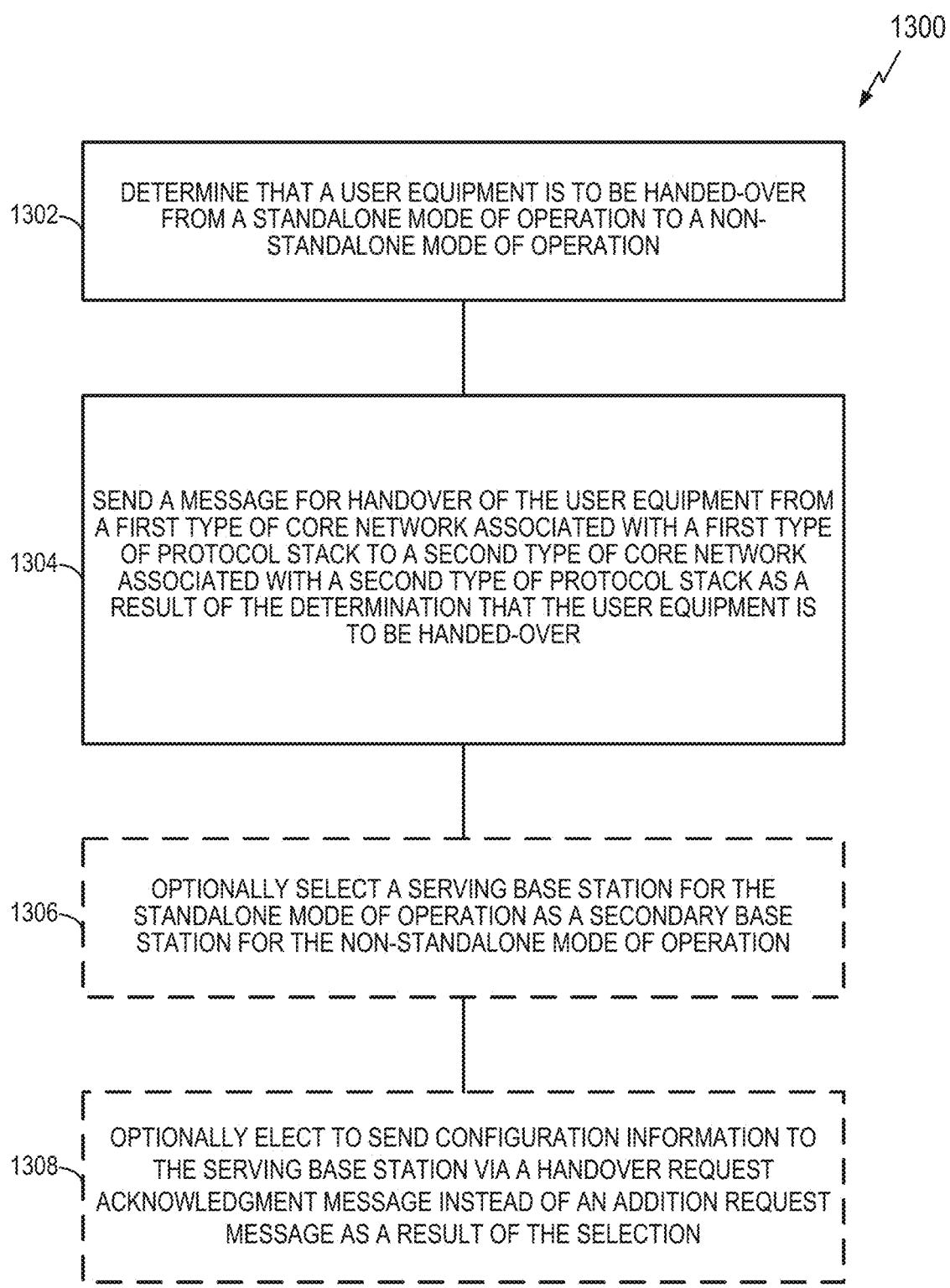
FIG. 13 is a flowchart illustrating another example of a handover process in accordance with some aspects of the disclosure.

FIG. 13 illustrates a process 1300 for communication in accordance with some aspects of the disclosure. The process 1300 may take place within a processing circuit (e.g., the processing circuit 1210 of FIG. 12), which may be located in a gNB, a BS, an eNB, a CPE, or some other suitable apparatus. Of course, in various aspects within the scope of the disclosure, the process 1300 may be implemented by any suitable apparatus capable of supporting communication-related operations.

At block 1302, an apparatus (e.g., a base station) determine that a user equipment is to be handed-over from a standalone mode of operation to a non-standalone mode of operation. In some aspects, the determination may be based on: a quality of service associated with the user equipment, multi-network capability of the user equipment, at least one measurement report from the user equipment, at least one policy, or any combination thereof.

In some implementations, the circuit/module for determining 1220 of FIG. 12 performs the operations of block 1302 and/or other similar operations as taught herein. In some implementations, the code for determining 1240 of FIG. 12 is executed to perform the operations of block 1302 and/or other similar operations as taught herein.

At block 1304, the apparatus sends a message for handover of the user equipment from a first type of core network associated with a first type of protocol stack to a second type of core network associated with a second type of protocol stack as a result of the determination that the user equipment is to be handed-over. In some aspects, the message may include (e.g., may be) an addition request message.

In some implementations, the circuit/module for sending 1222 of FIG. 12 performs the operations of block 1304 and/or other similar operations as taught herein. In some implementations, the code for sending 1242 of FIG. 12 is executed to perform the operations of block 1304 and/or other similar operations as taught herein.

In some cases, the process 1300 may include the operations of optional block 1306 that involve selecting a serving base station for the standalone mode of operation as a secondary base station for the non-standalone mode of operation. In some aspects, the selection may be based on at least one measurement report from the user equipment. In some aspects, the at least one measurement report may include (e.g., may be): a first set of measurement information for at least one cell connected to the first type of core network; and a second set of measurement information for at least one other cell connected to the second type of core network. In some aspects, the selection may be based on an indication that the serving base station for the standalone mode of operation is to be the secondary base station for the non-standalone mode of operation. In some aspects, the indication may be received via a handover request message. In some aspects, the message may include (e.g., may be) an indication that the serving base station is to use, for the non-standalone mode of operation, at least one data radio bearer that was used for the standalone mode of operation. In some aspects, the message may include (e.g., may be) an indication that the serving base station is to use, for the non-standalone mode of operation, security information that was used for the standalone mode of operation. In some aspects, the message may include (e.g., may be) a handover request acknowledgement message. In some aspects, the message may include (e.g., may be) an addition request message.

In some implementations, the circuit/module for selecting 1226 of FIG. 12 performs the operations of block 1306 and/or other similar operations as taught herein. In some implementations, the code for selecting 1246 of FIG. 12 is executed to perform the operations of block 1306 and/or other similar operations as taught herein.

In some cases, the process 1300 may include the operations of optional block 1308 that involve electing to send configuration information to the serving base station via a handover request acknowledgment message instead of an addition request message as a result of the selection.

In some implementations, the circuit/module for electing 1224 of FIG. 12 performs the operations of block 1308 and/or other similar operations as taught herein. In some implementations, the code for electing 1244 of FIG. 12 is executed to perform the operations of block 1308 and/or other similar operations as taught herein.

In some aspects, a process in accordance with the teachings herein may include any combination of the above operations.

Fourth Example Apparatus

Figure 14:
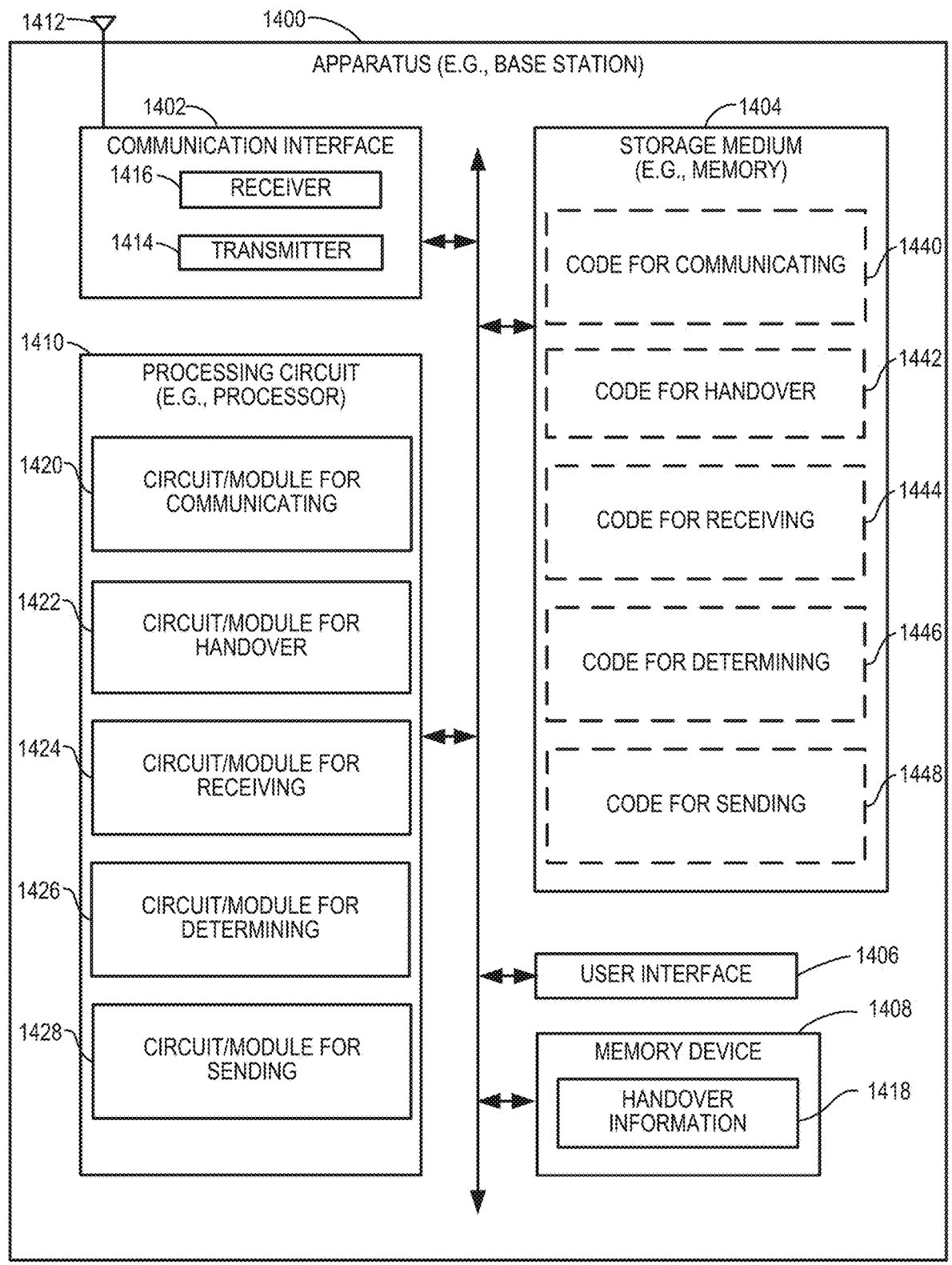
FIG. 14 is a block diagram illustrating an example hardware implementation for another apparatus (e.g., an electronic device) that can support communication in accordance with some aspects of the disclosure.

FIG. 14 illustrates a block diagram of an example hardware implementation of an apparatus 1400 configured to communicate according to one or more aspects of the disclosure. The apparatus 1400 could embody or be implemented within a UE, a gNB, a transmit receive point (TRP), a base station (BS), an eNode B (eNB), a CPE, or some other type of device that supports wireless communication. In various implementations, the apparatus 1400 could embody or be implemented within an access terminal, an access point, or some other type of device. In various implementations, the apparatus 1400 could embody or be implemented within a server, a personal computer, a mobile phone, a smart phone, a tablet, a portable computer, a sensor, an alarm, a vehicle, a machine, an entertainment device, a medical device, or any other electronic device having circuitry.

The apparatus 1400 includes a communication interface 1402 (e.g., at least one transceiver), a storage medium 1404, a user interface 1406, a memory device 1408 (e.g., storing handover information 1418), and a processing circuit 1410 (e.g., at least one processor). In various implementations, the user interface 1406 may include one or more of: a keypad, a display, a speaker, a microphone, a touchscreen display, of some other circuitry for receiving an input from or sending an output to a user. The communication interface 1402 may be coupled to one or more antennas 1412, and may include a transmitter 1414 and a receiver 1416. In general, the components of FIG. 14 may be similar to corresponding components of the apparatus 600 of FIG. 6.

According to one or more aspects of the disclosure, the processing circuit 1410 may be adapted to perform any or all of the features, processes, functions, operations and/or routines for any or all of the apparatuses described herein. For example, the processing circuit 1410 may be configured to perform any of the steps, functions, and/or processes described with respect to FIGS. 1-5 and 15. As used herein, the term "adapted" in relation to the processing circuit 1410 may refer to the processing circuit 1410 being one or more of configured, used, implemented, and/or programmed to perform a particular process, function, operation and/or routine according to various features described herein.

The processing circuit 1410 may be a specialized processor, such as an application specific integrated circuit (ASIC) that serves as a means for (e.g., structure for) carrying out any one of the operations described in conjunction with FIGS. 1-5 and 15. The processing circuit 1410 may serve as one example of a means for transmitting and/or a means for receiving. In some implementations, the processing circuit 1410 may provide and/or incorporate, at least in part, the functionality of one or more of the system components described herein (e.g., the module for SA/NSA handover 116 of FIG. 1).

According to at least one example of the apparatus 1400, the processing circuit 1410 may include one or more of a circuit/module for communicating 1420, a circuit/module for handover 1422, a circuit/module for receiving 1424, a circuit/module for determining 1426, or a circuit/module for sending 1428. In various implementations, the circuit/module for communicating 1420, the circuit/module for handover 1422, the circuit/module for receiving 1424, the circuit/module for determining 1426, or the circuit/module for sending 1428 may provide and/or incorporate, at least in part, the functionality of one or more of the system components described herein (e.g., the module for SA/NSA handover 116 of FIG. 1).

As mentioned above, programming stored by the storage medium 1404, when executed by the processing circuit 1410, causes the processing circuit 1410 to perform one or more of the various functions and/or process operations described herein. For example, the programming may cause the processing circuit 1410 to perform the various functions, steps, and/or processes described herein with respect to FIGS. 1-5 and 15 in various implementations. As shown in FIG. 14, the storage medium 1404 may include one or more of code for communicating 1440, code for handover 1442, code for receiving 1444, code for determining 1446, or code for sending 1448. In various implementations, the code for communicating 1440, the code for handover 1442, the code for receiving 1444, the code for determining 1446, or the code for sending 1448 may be executed or otherwise used to provide the functionality described herein for the circuit/module for communicating 1420, the circuit/module for handover 1422, the circuit/module for receiving 1424, the circuit/module for determining 1426, or the circuit/module for sending 1428.

The circuit/module for communicating 1420 may include circuitry and/or programming (e.g., code for communicating 1440 stored on the storage medium 1404) adapted to perform several functions relating to, for example, communicating information. In some implementations, the communication involves receiving the information. In some implementations, the communication involves sending (e.g., transmitting) the information.

The information may take different forms in different scenarios. In some aspects, the circuit/module for communicating 1420 may communicate a message. In some aspects, the circuit/module for communicating 1424 may communicate an indication.

In some implementations where the communicating involves receiving information, the circuit/module for communicating 1420 receives information (e.g., from the communication interface 1402, the receiver 1416, the memory device 1408, some other component of the apparatus 1400, or some other device), processes (e.g., decodes) the information, and outputs the information to another component of the apparatus 1400 (e.g., the memory device 1408 or some other component). In some scenarios (e.g., if the circuit/module for communicating 1420 includes a receiver), the communicating involves the circuit/module for communicating 1420 receiving information directly from a device that transmitted the information (e.g., via radio frequency signaling or some other type of signaling suitable for the applicable communication medium).

In some implementations where the communicating involves sending information, the circuit/module for communicating 1420 obtains information (e.g., from the memory device 1408 or some other component of the apparatus 1400), processes (e.g., encodes) the information, and outputs the processed information. In some scenarios, the communicating involves sending the information to another component of the apparatus 1400 (e.g., the transmitter 1414, the communication interface 1402, or some other component) that will transmit the information to another device. In some scenarios (e.g., if the circuit/module for communicating 1420 includes a transmitter), the communicating involves the circuit/module for communicating 1420 transmitting the information directly to another device (e.g., the ultimate destination) via radio frequency signaling or some other type of signaling suitable for the applicable communication medium.

The circuit/module for communicating 1420 (e.g., a means for communicating) may take various forms. In some aspects, the circuit/module for communicating 1424 may correspond to, for example, an interface (e.g., a bus interface, a send/receive interface, or some other type of signal interface), a communication device, a transceiver, a transmitter, a receiver, or some other similar component as discussed herein. In some implementations, the communication interface 1402 includes the circuit/module for communicating 1420 and/or the code for communicating 1440. In some implementations, the circuit/module for communicating 1420 and/or the code for communicating 1440 is configured to control the communication interface 1402 (e.g., a transceiver, a receiver, or a transmitter) to communicate the information.

The circuit/module for handover 1422 may include circuitry and/or programming (e.g., code for handover 1442 stored on the storage medium 1204) adapted to perform several functions relating to, for example, handing over a UE from a first type of core network to a second type of core network as discussed herein (e.g., upon determining that the second core network provides a service that the first core network does not provide, etc.). In some aspects, the circuit/module for handover 1422 (e.g., a means for handover) may correspond to, for example, a processing circuit.

The circuit/module for receiving 1424 may include circuitry and/or programming (e.g., code for receiving 1444 stored on the storage medium 1404) adapted to perform several functions relating to, for example, receiving information. In some scenarios, the circuit/module for receiving 1424 may obtain information (e.g., from the communication interface 1402, the memory device, or some other component of the apparatus 1400) and processes (e.g., decodes) the information. In some scenarios (e.g., if the circuit/module for receiving 1424 is or includes an RF receiver), the circuit/module for receiving 1424 may receive information directly from a device that transmitted the information. In either case, the circuit/module for receiving 1424 may output the obtained information to another component of the apparatus 1400 (e.g., the memory device 1408, or some other component).

The circuit/module for receiving 1424 (e.g., a means for receiving) may take various forms. In some aspects, the circuit/module for receiving 1424 may correspond to, for example, an interface (e.g., a bus interface, a send/receive interface, or some other type of signal interface), a communication device, a transceiver, a receiver, or some other similar component as discussed herein. In some implementations, the communication interface 1402 includes the circuit/module for receiving 1424 and/or the code for receiving 1444. In some implementations, the circuit/module for receiving 1424 and/or the code for receiving 1444 is configured to control the communication interface 1402 (e.g., a transceiver or a receiver) to receive information.

The circuit/module for determining 1426 may include circuitry and/or programming (e.g., code for determining 1446 stored on the storage medium 1404) adapted to perform several functions relating to, for example, determining information or a condition as discussed herein. In some aspects, the circuit/module for determining 1426 (e.g., a means for determining) may correspond to, for example, a processing circuit.

The circuit/module for sending 1428 may include circuitry and/or programming (e.g., code for sending 1448 stored on the storage medium 1404) adapted to perform several functions relating to, for example, sending (e.g., transmitting) information (e.g. a message, an indication, etc.). In some implementations, the circuit/module for sending 1428 may obtain information (e.g., from the memory device 1408, or some other component of the apparatus 1400), process the information (e.g., encode the information for transmission), and send the information to another component (e.g., the transmitter 1414, the communication interface 1402, or some other component) that will transmit the information to another device. In some scenarios (e.g., if the circuit/module for sending 1428 includes a transmitter), the circuit/module for sending 1428 transmits the information directly to another device (e.g., the ultimate destination) via radio frequency signaling or some other type of signaling suitable for the applicable communication medium.

The circuit/module for sending 1428 (e.g., a means for sending) may take various forms. In some aspects, the circuit/module for sending 1428 may correspond to, for example, an interface (e.g., a bus interface, a send/receive interface, or some other type of signal interface), a communication device, a transceiver, a transmitter, or some other similar component as discussed herein. In some implementations, the communication interface 1402 includes the circuit/module for sending 1428 and/or the code for sending 1448. In some implementations, the circuit/module for sending 1428 and/or the code for sending 1448 is configured to control the communication interface 1402 (e.g., a transceiver or a transmitter) to transmit information.

Fourth Example Process

Figure 15:
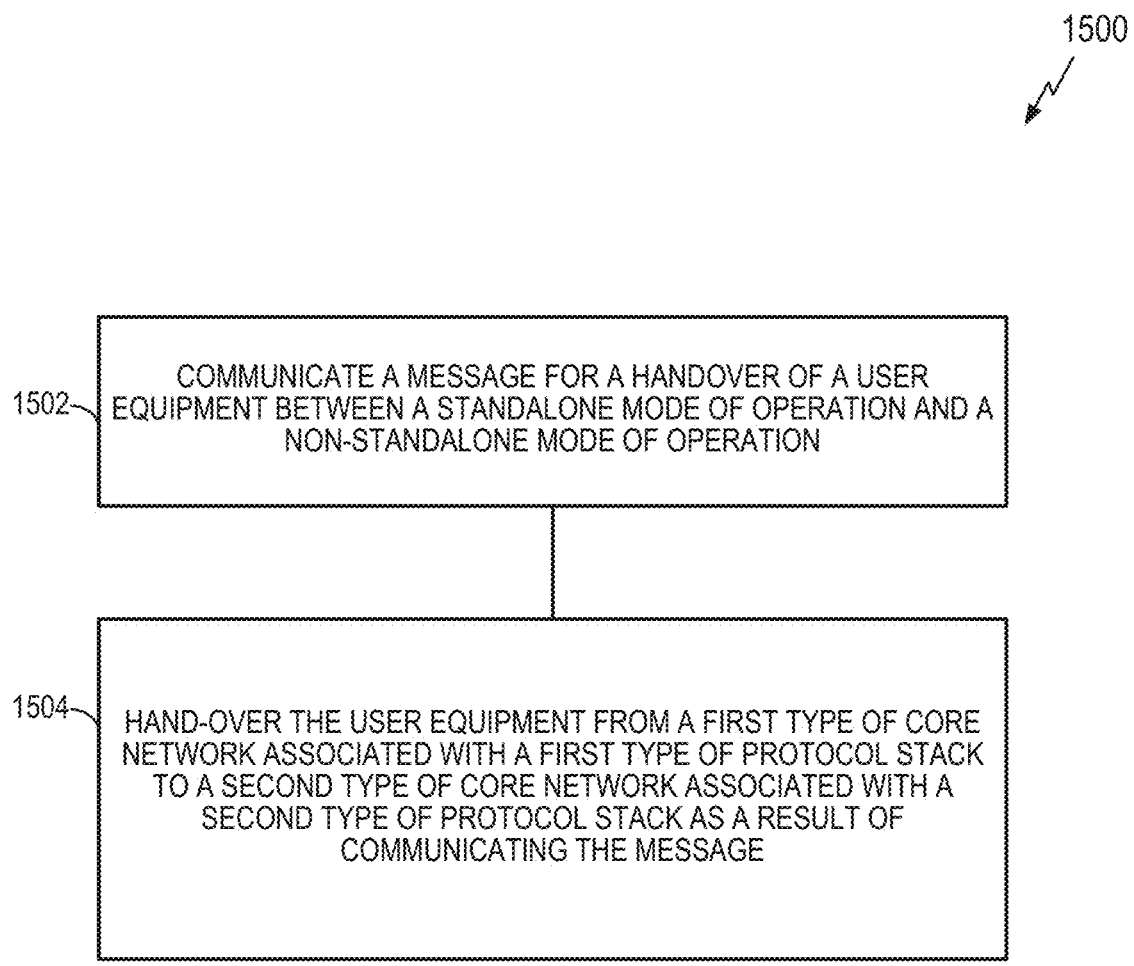
FIG. 15 is a flowchart illustrating another example of a handover process in accordance with some aspects of the disclosure.

FIG. 15 illustrates a process 1500 for communication in accordance with some aspects of the disclosure. The process 1500 may take place within a processing circuit (e.g., the processing circuit 1410 of FIG. 14), which may be located in a UE, a gNB, a BS, an eNB, a CPE, or some other suitable apparatus. Of course, in various aspects within the scope of the disclosure, the process 1500 may be implemented by any suitable apparatus capable of supporting communication-related operations.

At block 1502, an apparatus (e.g., a base station) communicates a message for a handover of a user equipment between a standalone mode of operation and a non-standalone mode of operation. In some aspects, the message may be a handover request message.

In some implementations, the circuit/module for communicating 1420 of FIG. 14 performs the operations of block 1502 and/or other similar operations as taught herein. In some implementations, the code for communicating 1440 of FIG. 14 is executed to perform the operations of block 1502 and/or other similar operations as taught herein.

At block 1504, the apparatus hands-over the user equipment from a first type of core network associated with a first type of protocol stack to a second type of core network associated with a second type of protocol stack as a result of communicating the message.

The handover may take different forms in different scenarios. In some aspects, the handover may be from the standalone mode of operation to the non-standalone mode of operation. In some aspects, the handover may be from the non-standalone mode of operation to the standalone mode of operation.

In some implementations, the circuit/module for handover 1422 of FIG. 14 performs the operations of block 1504 and/or other similar operations as taught herein. In some implementations, the code for handover 1442 of FIG. 14 is executed to perform the operations of block 1504 and/or other similar operations as taught herein.

In some aspects, the standalone mode of operation may include (e.g., may be) connectivity with a 3rd Generation Partnership Project (3GPP) New Radio (NR) network. In some aspects, the non-standalone mode of operation may include (e.g., may be) dual connectivity with a 3GPP NR network and at least one other network.

In some aspects, the first type of core network may include (e.g., may be) a 3rd Generation Partnership Project (3GPP) Long Term Evolution (LTE) core network. In some aspects, the second type of core network may include (e.g., may be) a 3GPP New Radio (NR) core network.

In some aspects, the message may include (e.g., may be) a handover required message. In this case, the communicating of the message may include sending the handover required message.

In some aspects, the message may include (e.g., may be) a connection reconfiguration message. In this case, the communicating of the message may include receiving the connection reconfiguration message.

In some aspects, a process in accordance with the teachings herein may include any combination of the above operations.

Other Aspects

Any of the following aspects may be implemented independently and/or combined with other aspects or embodiments disclosed herein.

In a first aspect, the disclosure may provide an apparatus configured for communication that includes a processing circuit and an interface coupled to the processing circuit. The processing circuit may be configured to: operate in a standalone mode of operation with a first type of core network associated with a first type of protocol stack; determine that the apparatus is to be handed-over from the standalone mode of operation to a non-standalone mode of operation; and operate in a non-standalone mode of operation with a second type of core network associated with a second type of protocol stack as a result of the determination.

In the first aspect, the disclosure may provide a method of communication for an apparatus. The method may include: operating in a standalone mode of operation with a first type of core network associated with a first type of protocol stack; determining that the apparatus is to be handed-over from the standalone mode of operation to a non-standalone mode of operation; and operating in a non-standalone mode of operation with a second type of core network associated with a second type of protocol stack as a result of the determination.

In the first aspect, the disclosure may provide an apparatus configured for communication. The apparatus may include: means for operating in a standalone mode of operation with a first type of core network associated with a first type of protocol stack; means for determining that the apparatus is to be handed-over from the standalone mode of operation to a non-standalone mode of operation; and means for operating in a non-standalone mode of operation with a second type of core network associated with a second type of protocol stack as a result of the determination.

In the first aspect, the disclosure may provide a non-transitory computer-readable medium storing computer-executable code, including code to: operate in a standalone mode of operation with a first type of core network associated with a first type of protocol stack; determine that the apparatus is to be handed-over from the standalone mode of operation to a non-standalone mode of operation; and operate in a non-standalone mode of operation with a second type of core network associated with a second type of protocol stack as a result of the determination.

The first aspect may be modified based on one or more of the following. The first aspect may include obtaining first context information for the standalone mode of operation; obtaining second context information for the non-standalone mode of operation; and maintaining the first context information and the second context information during handover from the standalone mode of operation to a non-standalone mode of operation. The first aspect may include determining that the handover failed; and reverting to use of the first context information as a result of the determination that the handover failed. The first aspect may involve the determination that the apparatus is to be handed-over including receiving a connection reconfiguration message including non-standalone mode configuration information for the second type of core network. The first aspect may include using first security information for the standalone mode of operation; receiving an indication to use the first security information for the non-standalone mode of operation; and using the first security information for the standalone mode of operation as a result of receiving the indication. The first aspect may involve the indication being received via an addition request message. The first aspect may include acquiring a first set of measurement information for at least one cell of a current serving RAT (Radio Access Technology); acquiring a second set of measurement information for at least one other cell of a second type of RAT; and sending the first set of measurement information and the second set of measurement information to a serving cell while operating in the standalone mode of operation. The first aspect may involve the standalone mode of operation including connectivity with a 3rd Generation Partnership Project (3GPP) New Radio (NR) network; and the non-standalone mode of operation including dual connectivity with a 3GPP NR network and at least one other network. The first aspect may involve the first type of core network including a 3rd Generation Partnership Project (3GPP) 4G core network; and the second type of core network including a 3GPP 5G core network. The first aspect may include sending device capability bits indicating whether the apparatus supports: handover from SA to NSA, handover from NSA to SA, inter-system handover from SA to NSA, inter-system handover from NSA to SA, or any combination thereof. The first aspect may include determining that a source base station for the standalone mode of operation is a secondary base station for the non-standalone mode of operation; and electing to not conduct a random access to the secondary base station as a result of the determination that the source base station for the standalone mode of operation is the secondary base station for the non-standalone mode of operation.

In a second aspect, the disclosure may provide an apparatus configured for communication that includes a processing circuit and an interface coupled to the processing circuit. The processing circuit may be configured to: determine that a user equipment is to be handed-over from a standalone mode of operation to a non-standalone mode of operation; and send a message for handover of the user equipment from a first type of core network associated with a first type of protocol stack to a second type of core network associated with a second type of protocol stack as a result of the determination that the user equipment is to be handed-over.

In the second aspect, the disclosure may provide a method of communication for an apparatus. The method may include: determining that a user equipment is to be handed-over from a standalone mode of operation to a non-standalone mode of operation; and sending a message for handover of the user equipment from a first type of core network associated with a first type of protocol stack to a second type of core network associated with a second type of protocol stack as a result of the determination that the user equipment is to be handed-over.

In the second aspect, the disclosure may provide an apparatus configured for communication. The apparatus may include: means for determining that a user equipment is to be handed-over from a standalone mode of operation to a non-standalone mode of operation; and means for sending a message for handover of the user equipment from a first type of core network associated with a first type of protocol stack to a second type of core network associated with a second type of protocol stack as a result of the determination that the user equipment is to be handed-over.

In the second aspect, the disclosure may provide a non-transitory computer-readable medium storing computer-executable code, including code to: determine that a user equipment is to be handed-over from a standalone mode of operation to a non-standalone mode of operation; and send a message for handover of the user equipment from a first type of core network associated with a first type of protocol stack to a second type of core network associated with a second type of protocol stack as a result of the determination that the user equipment is to be handed-over.

The second aspect may be modified based on one or more of the following. The second aspect may involve the determination that the user equipment is to be handed-over including: determining that the standalone mode of operation does not provide a particular type of service. The second aspect may involve the particular type of service including Voice over New Radio (VoNR) service. The second aspect may involve the message including: a first set of measurement information for at least one cell connected to the first type of core network; and a second set of measurement information for at least one other cell connected to the second type of core network. The second aspect may involve: the first set of measurement information including 3rd Generation Partnership Project (3GPP) Evolved Universal Terrestrial Radio Access (E-UTRA) measurement information; and the second set of measurement information including 3GPP New Radio (NR) measurement information. The second aspect may include: determining that communication by the user equipment uses a particular quality of service; and electing to include in the message a first set of measurement information for at least one cell connected to the first type of core network and a second set of measurement information for at least one other cell connected to the second type of core network, wherein the election is based on the determination that the communication by the user equipment uses a particular quality of service. The second aspect may involve the particular quality of service including a high performance quality of service. The second aspect may involve the message including an indication that a serving base station for the standalone mode of operation is to be a secondary base station for the non-standalone mode of operation. The second aspect may involve the message including a handover required message. The second aspect may include: using first security information for the standalone mode of operation; receiving an indication to use the first security information for the non-standalone mode of operation; and using the first security information for the standalone mode of operation as a result of receiving the indication. The second aspect may involve the indication being received via an addition request message. The second aspect may include: using at least one first data radio bearer for the standalone mode of operation; determining that a source base station for the standalone mode of operation is a secondary base station for the non-standalone mode of operation; and using the at least one first data radio bearer for the non-standalone mode of operation as a result of the determination that the source base station for the standalone mode of operation is the secondary base station for the non-standalone mode of operation. The second aspect may include: determining that a source base station for the standalone mode of operation is a secondary base station for the non-standalone mode of operation; and receiving configuration information via a handover command instead of an addition request in response to the determination that the source base station for the standalone mode of operation is the secondary base station for the non-standalone mode of operation.

In a third aspect, the disclosure may provide an apparatus configured for communication that includes a processing circuit and an interface coupled to the processing circuit. The processing circuit may be configured to: determine that a user equipment is to be handed-over from a standalone mode of operation to a non-standalone mode of operation; and send a message for handover of the user equipment from a first type of core network associated with a first type of protocol stack to a second type of core network associated with a second type of protocol stack as a result of the determination that the user equipment is to be handed-over.

In the third aspect, the disclosure may provide a method of communication for an apparatus. The method may include: determining that a user equipment is to be handed-over from a standalone mode of operation to a non-standalone mode of operation; and sending a message for handover of the user equipment from a first type of core network associated with a first type of protocol stack to a second type of core network associated with a second type of protocol stack as a result of the determination that the user equipment is to be handed-over.

In the third aspect, the disclosure may provide an apparatus configured for communication. The apparatus may include: means for determining that a user equipment is to be handed-over from a standalone mode of operation to a non-standalone mode of operation; and means for sending a message for handover of the user equipment from a first type of core network associated with a first type of protocol stack to a second type of core network associated with a second type of protocol stack as a result of the determination that the user equipment is to be handed-over.

In the third aspect, the disclosure may provide a non-transitory computer-readable medium storing computer-executable code, including code to: determine that a user equipment is to be handed-over from a standalone mode of operation to a non-standalone mode of operation; and send a message for handover of the user equipment from a first type of core network associated with a first type of protocol stack to a second type of core network associated with a second type of protocol stack as a result of the determination that the user equipment is to be handed-over.

The third aspect may be modified based on one or more of the following. The third aspect may involve the determination being based on: a quality of service associated with the user equipment, multi-network capability of the user equipment, at least one measurement report from the user equipment, at least one policy, or any combination thereof. The third aspect may involve the message including an addition request message. The third aspect may include selecting a serving base station for the standalone mode of operation as a secondary base station for the non-standalone mode of operation. The third aspect may involve the selection being based on at least one measurement report from the user equipment. The third aspect may involve: the at least one measurement report including: a first set of measurement information for at least one cell connected to the first type of core network; and a second set of measurement information for at least one other cell connected to the second type of core network. The third aspect may involve the selection being based on an indication that the serving base station for the standalone mode of operation is to be the secondary base station for the non-standalone mode of operation. The third aspect may involve the indication being received via a handover request message. The third aspect may involve the message including an indication that the serving base station is to use, for the non-standalone mode of operation, at least one data radio bearer that was used for the standalone mode of operation. The third aspect may involve the message including an indication that the serving base station is to use, for the non-standalone mode of operation, security information that was used for the standalone mode of operation. The third aspect may involve the message including a handover request acknowledgement message. The third aspect may involve the message including an addition request message. The third aspect may include electing to send configuration information to the serving base station via a handover request acknowledgment message instead of an addition request message as a result of the selection.

In a fourth aspect, the disclosure may provide an apparatus configured for communication that includes a processing circuit and an interface coupled to the processing circuit. The processing circuit may be configured to: communicate a message for a handover of a user equipment between a standalone mode of operation and a non-standalone mode of operation; and hand-over the user equipment from a first type of core network associated with a first type of protocol stack to a second type of core network associated with a second type of protocol stack as a result of communicating the message.

In the fourth aspect, the disclosure may provide a method of communication for an apparatus. The method may include: communicating a message for a handover of a user equipment between a standalone mode of operation and a non-standalone mode of operation; and handing-over the user equipment from a first type of core network associated with a first type of protocol stack to a second type of core network associated with a second type of protocol stack as a result of communicating the message.

In the fourth aspect, the disclosure may provide an apparatus configured for communication. The apparatus may include: means for communicating a message for a handover of a user equipment between a standalone mode of operation and a non-standalone mode of operation; and means for handing-over the user equipment from a first type of core network associated with a first type of protocol stack to a second type of core network associated with a second type of protocol stack as a result of communicating the message.

In the fourth aspect, the disclosure may provide a non-transitory computer-readable medium storing computer-executable code, including code to: communicate a message for a handover of a user equipment between a standalone mode of operation and a non-standalone mode of operation; and hand-over the user equipment from a first type of core network associated with a first type of protocol stack to a second type of core network associated with a second type of protocol stack as a result of communicating the message.

The fourth aspect may be modified based on one or more of the following. The fourth aspect may involve the handover being from the standalone mode of operation to the non-standalone mode of operation. The fourth aspect may involve the handover being from the non-standalone mode of operation to the standalone mode of operation. The fourth aspect may involve: the standalone mode of operation including connectivity with a 3rd Generation Partnership Project (3GPP) New Radio (NR) network; and the non-standalone mode of operation including dual connectivity with a 3GPP NR network and at least one other network. The fourth aspect may involve: the first type of core network including a 3rd Generation Partnership Project (3GPP) Long Term Evolution (LTE) core network; and the second type of core network including a 3GPP New Radio (NR) core network. The fourth aspect may involve: the message including a handover required message; and the communicating of the message including sending the handover required message. The fourth aspect may involve: the message including a connection reconfiguration message; and the communicating of the message including receiving the connection reconfiguration message. The fourth aspect may involve the message including a handover request message.

Additional Aspects

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

As those skilled in the art will readily appreciate, various aspects described throughout this disclosure may be extended to any suitable telecommunication system, network architecture, and communication standard. By way of example, various aspects may be applied to wide area networks, peer-to-peer network, local area network, other suitable systems, or any combination thereof, including those described by yet-to-be defined standards.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory. ROM memory, EPROM memory. EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a" "an" and "the" are intended to include the plural forms as well, unless the context clearly indicates otherwise. It will be further understood that the terms "comprises," "comprising." "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first." "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. An apparatus for communication, comprising:
an interface; and
a processing circuit coupled to the interface and configured to:
transmit a first message indicating that a user equipment is to be handed-over from a standalone mode of operation, the first message comprising an indication that a serving base station for the standalone mode of operation is to be a secondary base station for a non-standalone mode of operation; and
transmit a second message to configure the user equipment for the non-standalone mode of operation.

2. The apparatus of claim 1, wherein the first message comprises a handover required message.

3. The apparatus of claim 1, wherein the first message comprises:
a first set of measurement information for at least one cell connected to a first type of core network; and
a second set of measurement information for at least one other cell connected to a second type of core network.

4. The apparatus of claim 3, wherein:
the first set of measurement information comprises 3rd Generation Partnership Project (3GPP) Evolved Universal Terrestrial Radio Access (E-UTRA) measurement information; and
the second set of measurement information comprises 3GPP New Radio (NR) measurement information.

5. The apparatus of claim 1, wherein the processing circuit is further configured to:
transmit the first message based on a determination that the standalone mode of operation does not provide a particular type of service.

6. The apparatus of claim 5, wherein the particular type of service comprises Voice over New Radio (VoNR) service.

7. The apparatus of claim 1, wherein the processing circuit is further configured to:
transmit the first message based on a determination that communication by the user equipment uses a particular quality of service.

8. The apparatus of claim 1, wherein the processing circuit is further configured to:
select the serving base station for the standalone mode of operation as the secondary base station for the non-standalone mode of operation.

9. The apparatus of claim 8, wherein the selection of the serving base station for the standalone mode of operation as the secondary base station for the non-standalone mode of operation is based on at least one measurement report from the user equipment.

10. The apparatus of claim 9, wherein the at least one measurement report comprises:
a first set of measurement information for at least one cell connected to a first type of core network; and
a second set of measurement information for at least one other cell connected to a second type of core network.

11. The apparatus of claim 8, wherein the processing circuit is further configured to:
receive configuration information via a handover request acknowledgment message instead of an addition request message based on the selection of the serving base station for the standalone mode of operation as the secondary base station for the non-standalone mode of operation.

12. The apparatus of claim 1, wherein the processing circuit is further configured to:
use first security information for the standalone mode of operation;
receive an indication to use the first security information for the non-standalone mode of operation; and
use the first security information for the non-standalone mode of operation based on the receipt of the indication.

13. The apparatus of claim 1, wherein the processing circuit is further configured to:
use at least one first data radio bearer for the standalone mode of operation; and
use the at least one first data radio bearer for the non-standalone mode of operation based on the message indicating that the serving base station for the standalone mode of operation is to be the secondary base station for the non-standalone mode of operation.

14. The apparatus of claim 1, wherein the processing circuit is further configured to:
receive configuration information via a handover command instead of an addition request based on the message indicating that the serving base station for the standalone mode of operation is to be the secondary base station for the non-standalone mode of operation.

15. The apparatus of claim 1, wherein the processing circuit is further configured to perform at least one of:
use, for the non-standalone mode of operation, security information that was used for the standalone mode of operation; or
use, for the non-standalone mode of operation, at least one data radio bearer that was used for the standalone mode of operation.

16. A method for communication at an apparatus, comprising:
transmitting a first message indicating that a user equipment is to be handed-over from a standalone mode of operation, the first message comprising an indication that a serving base station for the standalone mode of operation is to be a secondary base station for a non-standalone mode of operation; and
transmitting a second message to configure the user equipment for the non-standalone mode of operation.

17. The method of claim 16, wherein the first message comprises a handover required message.

18. The method of claim 16, wherein:
the standalone mode of operation is associated with a single radio access technology; and
the non-standalone mode of operation is associated with a plurality of radio access technologies.

19. The method of claim 16, wherein:
the first message comprises an NG-AP handover required message associated with an inter-system handover from a 5G system to an evolved packet system where a source node is used as a target secondary node; and
the source node comprises a gNB.

20. A user equipment, comprising:
an interface; and
a processing circuit coupled to the interface and configured to:
operate in a non-standalone mode of operation with a first type of core network;
receive a message indicating that the user equipment is to be handed-over from the non-standalone mode of operation to a standalone mode of operation with a second type of core network; and
operate in the standalone mode of operation after receipt of the message.

21. The user equipment of claim 20, wherein:
the standalone mode of operation comprises connectivity with a 3rd Generation Partnership Project (3GPP) New Radio (NR) network; and
the non-standalone mode of operation comprises dual connectivity with a 3GPP NR network and at least one other network.

22. The user equipment of claim 20, wherein:
the first type of core network comprises a 3rd Generation Partnership Project (3GPP) Fourth Generation (4G) core network; and
the second type of core network comprises a 3GPP Fifth Generation (5G) core network.

23. The user equipment of claim 20, wherein the processing circuit is further configured to:
obtain first context information for the non-standalone mode of operation;
obtain second context information for the standalone mode of operation; and
maintain the first context information and the second context information during handover from the non-standalone mode of operation to the standalone mode of operation.

24. The user equipment of claim 23, wherein the processing circuit is further configured to:
determine that the handover failed; and
revert to use of the first context information based on the determination that the handover failed.

25. The user equipment of claim 20, wherein the message comprises a connection reconfiguration message including standalone mode configuration information for the second type of core network.

26. The user equipment of claim 20, wherein the processing circuit is further configured to:
use first security information for the non-standalone mode of operation;
receive an indication via an addition request message to use the first security information for the standalone mode of operation; and
use the first security information for the standalone mode of operation based on the receipt of the indication.

27. The user equipment of claim 20, wherein the processing circuit is further configured to:
send device capability bits indicating whether the user equipment supports: handover from the non-standalone mode of operation to the standalone mode of operation, handover from the standalone mode of operation to the non-standalone mode of operation, inter-system handover from the non-standalone mode of operation to the standalone mode of operation, inter-system handover from the standalone mode of operation to the non-standalone mode of operation, or any combination thereof.

28. The user equipment of claim 26, wherein:
the standalone mode of operation is associated with a single radio access technology; and
the non-standalone mode of operation is associated with a plurality of radio access technologies.

29. A method for communication at a user equipment, comprising:
operating in a non-standalone mode of operation with a first type of core network;
receiving a message indicating that the user equipment is to be handed-over from the non-standalone mode of operation to a standalone mode of operation with a second type of core network; and operating in the standalone mode of operation after receiving the message.

30. The method of claim 29, wherein:

the message comprises a radio resource control connection reconfiguration message associated with an inter-system handover from an evolved packet system to a 5G system; and a secondary node comprises a gNB.

* * * * *